US011493241B2

(12) United States Patent
Yasumoto

(10) Patent No.: US 11,493,241 B2
(45) Date of Patent: Nov. 8, 2022

(54) METHOD OF CONTROLLING HEAT EXCHANGE DEVICE, HEAT EXCHANGE DEVICE, AND WATER-COOLED TYPE HEAT PUMP DEVICE

(71) Applicant: ECO-PLANNER CO., LTD., Fukui (JP)

(72) Inventor: Satoshi Yasumoto, Fukui (JP)

(73) Assignee: ECO-PLANNER CO., LTD., Fukui (JP)

( * ) Notice: Subject to any disclaimer, the term of this patent is extended or adjusted under 35 U.S.C. 154(b) by 229 days.

(21) Appl. No.: 16/626,749

(22) PCT Filed: Jan. 30, 2019

(86) PCT No.: PCT/JP2019/003078
§ 371 (c)(1),
(2) Date: Dec. 26, 2019

(87) PCT Pub. No.: WO2019/151289
PCT Pub. Date: Aug. 8, 2019

(65) Prior Publication Data
US 2020/0116397 A1    Apr. 16, 2020

(30) Foreign Application Priority Data

Jan. 30, 2018    (JP) .............................. JP2018-013285

(51) Int. Cl.
*F25B 13/00*    (2006.01)
*F25B 30/06*    (2006.01)

(52) U.S. Cl.
CPC .............. *F25B 13/00* (2013.01); *F25B 30/06* (2013.01)

(58) Field of Classification Search
CPC .... F25B 13/00; F25B 30/16; F25B 2313/002; F25B 2313/004; F24D 220/11; F24D 3/18; F24D 2200/11
See application file for complete search history.

(56) References Cited

U.S. PATENT DOCUMENTS 4,325,228 A *    4/1982  Wolf ....................... F25B 30/06
                                                              165/142
5,018,848 A       5/1991  Kamiya et al.
                          (Continued)

FOREIGN PATENT DOCUMENTS

CN         2783217 Y     5/2006
CN       101939598 A     1/2011
                          (Continued)

*Primary Examiner* — Larry L Furdge
(74) *Attorney, Agent, or Firm* — R. Neil Sudol; Henry D. Coleman

(57) ABSTRACT

A heat transfer medium liquid circulation flow channel having a first heat exchange unit exchanging heat to a second heat exchange unit is provided, and a fixed amount of first heat transfer medium liquid circulates therein. A feed pipe couples heat source holding second heat transfer medium liquid having temperature difference from the first medium liquid to the heat transfer medium liquid circulation flow channel. The feed pipe is coupled to an inlet end side of the first heat exchange unit and a discharge pipe is coupled to an outlet end side thereof. A necessary amount of second medium liquid is supplied to the inlet end side via the feed pipe so that a detected temperature of the first medium liquid in the outlet end maintains required set temperature. The same amount of the first medium liquid as the supplied second medium liquid is discharged out of the discharge pipe.

15 Claims, 17 Drawing Sheets

(56) References Cited

U.S. PATENT DOCUMENTS

| | | | | |
|---|---|---|---|---|
| 5,081,848 A | * | 1/1992 | Rawlings | F25B 30/06 |
| | | | | 62/260 |
| 2015/0377535 A1 | * | 12/2015 | Kono | F28F 27/003 |
| | | | | 62/186 |
| 2018/0283526 A1 | * | 10/2018 | Sung | F16H 57/0441 |

FOREIGN PATENT DOCUMENTS

| | | |
|---|---|---|
| CN | 102667370 A | 9/2012 |
| CN | 107044733 A | 8/2017 |
| JP | 57169551 A | 10/1982 |
| JP | 06-147653 A | 5/1994 |
| JP | 2001317817 A | 11/2001 |
| JP | 2001343197 A | 12/2001 |
| JP | 2002081763 A | 3/2002 |
| JP | 2010175136 A | 8/2010 |
| JP | 06108287 A | 10/2014 |
| JP | 2016109340 A | 6/2016 |
| JP | 2016121861 A | 7/2016 |
| JP | 2016-217688 A | 12/2016 |
| JP | 2017032148 A | 2/2017 |
| JP | 2017032218 A | 2/2017 |
| JP | 2017096585 A | 6/2017 |
| KR | 101095483 B1 | 12/2011 |

\* cited by examiner

PRIOR ART

PRIOR ART

PRIOR ART

METHOD OF CONTROLLING HEAT EXCHANGE DEVICE, HEAT EXCHANGE DEVICE, AND WATER-COOLED TYPE HEAT PUMP DEVICE

TECHNICAL FIELD

The present invention relates to a method of controlling a heat exchange device which can efficiently utilize a heat source such as an earth thermal, and the heat exchange device. Further, the present invention relates to a water-cooled type heat pump device which employ the heat exchange device.

BACKGROUND ART

One example of a heat exchange device utilizing an earth thermal as a heat source is described in patent document 1 and patent document 2. These heat exchange devices are configured to utilize as the heat source the earth thermal which is kept at a fixed temperature (for example, about 15° C. in Fukui prefecture) throughout the year. A heat exchange device a according to the patent document 1 is structured, as shown in FIG. 18, such that a heat transfer medium liquid c is stored in a heat exchange storage tank b formed by covering an inner wall portion of a hole portion provided by excavating the ground to a required depth with a closed-end cylindrical casing. Further, a first tube body f is coupled to one end portion e of a heat exchange unit d which can radiate heat in a heat exchange region where a heat radiation is required, or absorb heat in a heat exchange region where a heat absorption is required, and a second tube body h is coupled to the other end portion g of the heat exchange unit d. An end portion j of the first tube body f and an end portion k of the second tube body h are both arranged within the heat exchange storage tank b at a required interval, a lower end opening m of the first tube body f is positioned upward and a lower end opening p of the second tube body h is positioned downward. Further, by driving a pump q arranged at an intermediate required position of the first tube body f or the second tube body h, the heat transfer medium liquid c within the heat exchange storage tank b is sent to the heat exchange unit d, and the heat transfer medium liquid c is returned from the heat exchange unit d into the heat exchange storage tank b.

More specifically, a circulation flow channel r in which the heat transfer medium liquid c circulates in the heat exchange storage tank b and the heat exchange unit d is formed, and the heat transfer medium liquid c circulates in the circulation flow channel r by driving the pump q. A direction of this circulation can be switched by a flow channel switching device i employing a three-way valve, as shown in FIGS. 18 and 19.

Taking into consideration the fact that the temperature of the heat transfer medium liquid within the underground buried heat exchange storage tank b is higher in its upper portion s and lower in its lower portion t, the heat transfer medium liquid c having the high temperature is supplied to the heat exchange unit d and the heat transfer medium liquid c is returned into the heat exchange storage tank b from the lower end opening p positioned below by using the lower end opening m positioned above as an inflow port on the basis of the driving of the pump q during the winter season as shown in FIG. 18. In an opposite manner, during the summer season, as shown in FIG. 19, the heat transfer medium liquid c having the low temperature within the heat exchange storage tank b is supplied to the heat exchange unit d by using the lower end opening p positioned below as an inflow port and the heat transfer medium liquid c is returned into the heat exchange storage tank b by using the lower end opening m positioned above as an outflow port.

Further, the patent document 1 describes that a cooling and heating operation of the building is carried out in the heat exchange unit d. FIGS. 18 to 19 show a case where the heat exchange device a having the structure mentioned above is applied for constructing a water-cooled type heat pump cooling and heating device (hereinafter, refer also to as a cooling and heating device) v.

When heating the load side by the cooling and heating device v, the heat transfer medium liquid c from which the earth thermal is absorbed via a wall portion w in the heat exchange storage tank b is carried to a first heat exchanger a1 serving as an evaporation unit of a heat pump y by the driving of the pump q as shown in FIG. 18. In the first heat exchanger a1, the heat is radiated from the carried heat transfer medium liquid c to the low-temperature and low-pressure heat pump heat medium passing through the expansion valve b1, so that the temperature of the heat pump heat medium is increased. After the heat pump heat medium is compressed by a compressor a3 so as to be temperature increased, the heat is exchanged between the heat pump heat medium and the air in the load side c1 by a second heat exchanger d1 serving as a condensation unit installed in the load side c1, and is radiated to the load side c1 so that the load side c1 can be heated.

In an opposite manner, when the load side c1 is cooled during the summer season, the heat of the air in the load side c1 is absorbed by the heat medium in the heat absorption tube of the second heat exchanger d1, the heat medium is compressed by the compressor a3, and the heat is thereafter radiated into the heat transfer medium liquid c by the first heat exchanger a1 serving as the condensation unit. The heat transfer medium liquid c absorbing heat is carried to the heat exchange storage tank b by the pressure of the pump q, is heat radiated into the ground via the wall portion w thereof by the heat exchange storage tank b, and is thereafter returned to the first heat exchanger a1.

Next, a description will be given of a problem in the cooling and heating device v. In the following description, an annual average temperature of the earth thermal is specified as 15° C. as a matter of convenience. In the cooling and heating device v, a circulation volume of the heat transfer medium liquid c circulating in the circulation flow channel r is defined to a predetermined amount. If the heat transfer medium liquid less than the predetermined amount is injected, the heat transfer medium liquid only passes through a part within the heat exchange unit d, so that a predetermined efficiency of heat exchange can not be achieved. As a result, it is necessary to always circulate a predetermined amount of heat transfer medium liquid c within the heat exchange storage tank b.

However, the heat transfer medium liquid c within the heat exchange storage tank b may have a temperature which is unnecessarily beyond a liquid temperature which the cooling and heating device v requires or may have a temperature which is unnecessarily below the liquid temperature.

For example, in the case where the cooling and heating device v is used for heating, it is assumed that the predetermined circulation volume required by the cooling and heating device v is 20 L/min, the necessary liquid temperature of the inlet end f1 of the heat exchange unit d is 5° C., and the liquid temperature of the outlet end g1 thereof is 0° C. In this case, by setting the temperature of the heat transfer medium liquid c within the heat exchange storage tank b heated by the earth thermal to 15° C. in spite of 5° C. of the necessary liquid temperature, the heat transfer medium liquid c is returned into the heat exchange storage tank b without using up the thermal energy contained in the heat transfer medium liquid c when the heat transfer medium liquid c having the temperature of 15° C. is supplied to the heat exchange unit d. As a result, the temperature of the returned heat transfer medium liquid c comes to 10° C. if the thermal energy is not wastefully discharged during the circulation of the heat transfer medium liquid c in the circulation flow channel r.

As mentioned above, since the annual average temperature of the earth thermal is 15° C., a temperature difference between the temperature of the heat transfer medium liquid c returned to the heat exchange storage tank b and the temperature of the earth thermal is 5° C. In the meantime, the greater the temperature difference is between the heat transfer medium liquid c within the heat exchange storage tank b and the earth thermal is, the higher the efficiency of heat exchange is between the both. On the assumption that the temperature of the heat transfer medium liquid within the heat exchange storage tank b is 0° C. which is the lowest temperature mentioned above, the temperature difference in relation to the earth thermal comes to 15° C. As a result, it is possible to improve the efficiency of heat exchange between the heat transfer medium liquid c within the heat exchange storage tank b and the earth thermal. However, there have been conventionally a problem that the efficiency of heat exchange is not good.

In addition, the supply of the heat transfer medium liquid c having the unnecessarily high temperature to the heat exchange unit d as mentioned above causes the wasteful discharge of the thermal energy which is heat stored in the heat transfer medium c of the heat exchange storage tank b. As mentioned above, the conventional cooling and heating device v has been an uneconomical cooling and heating device which is not good in the heat efficiency as a whole.

Further, even in the case where the temperature of the heat transfer medium liquid c within the heat exchange storage tank b comes down to 5° C. due to progress of circulation of the heat transfer medium liquid c, the cooling and heating device v comes close to the predetermined temperature in its load side when a fixed time has passed after the actuation of the cooling and heating device v. Therefore, the amount of heat exchange may be reduced in the heat exchange unit d in comparison with the starting time. As a result, the same event as mentioned above has occurred. More specifically, even if the necessary liquid temperature in the heat exchange unit d is 5° C. at the starting time, the amount of heat exchange in the heat exchange unit d becomes at least better when the load side c1 becomes warmer to some extent. Therefore, the necessary liquid temperature may come to 1° C. If the heat transfer medium liquid having the liquid temperature of 5° C. is supplied to the necessary liquid temperature of 1° C. as mentioned above, the temperature difference between the heat transfer medium liquid c returned to the heat exchange storage tank b and the earth thermal becomes smaller accordingly, thereby generating the problem that the efficiency of heat exchange is not good between the heat transfer medium liquid c and the earth thermal.

Further, when the cooling and heating device v is used for cooling, it is assumed that the predetermined circulation volume required by the cooling and heating device v is set to 20 L/min, the necessary liquid temperature of the inlet end f1 of the heat exchange unit d is set to 30° C., and the liquid temperature of the outlet end g1 thereof is 35° C. In this case, the temperature of the heat transfer medium liquid c within the heat exchange storage tank b cooled by the earth thermal is 15° C. while the necessary liquid temperature is 30° C. Therefore, when the heat transfer medium liquid c having the temperature of 15° C. is supplied to the heat exchange unit d, the heat transfer medium liquid c is returned into the heat exchange storage tank b without using up the thermal energy contained in the heat transfer medium liquid c. As a result, the temperature of the returned heat transfer medium liquid c comes to 20° C. if the thermal energy is not wastefully discharged during the circulation of the heat transfer medium liquid c in the circulation flow channel r.

Since the annual average temperature of the earth thermal is 15° C. as mentioned above, the temperature difference between the heat transfer medium liquid c returned to the heat exchange storage tank b and the earth thermal comes to 5° C. In the meantime, the greater the temperature difference is between the heat transfer medium liquid c within the heat transfer medium liquid storage tank b and the earth thermal, the higher the efficiency of heat exchange is between the both as mentioned above. On the assumption that the temperature of the heat transfer medium liquid c within the heat exchange storage tank b is 35° C. which is the highest temperature mentioned above, the temperature difference in relation to the earth thermal comes to 20° C. As a result, it is possible to improve the efficiency of heat exchange between the heat transfer medium liquid c within the heat exchange storage tank b and the earth thermal. However, there have been conventionally the problem that the efficiency of heat exchange is not good.

In addition, the supply of the heat transfer medium liquid c having the unnecessarily low temperature to the heat exchange unit d as mentioned above causes the wasteful discharge of the thermal energy which is heat stored in the heat transfer medium c of the heat exchange storage tank b. As mentioned above, the conventional cooling and heating device v has been an uneconomical cooling and heating device which is not good in the heat efficiency as a whole.

Further, even in the case where the temperature of the heat transfer medium liquid c within the heat exchange storage tank b comes up to 30° C. due to progress of circulation of the heat transfer medium liquid c, the cooling and heating device v comes close to the predetermined temperature in its load side when a fixed time has passed after the actuation of the cooling and heating device v. Therefore, the amount of heat exchange may be reduced in the heat exchange unit d in comparison with the starting time. As a result, the same event as mentioned above has occurred. More specifically, even if the necessary liquid temperature in the heat exchange unit d is 30° C. at the starting time, the amount of heat exchange in the heat exchange unit d becomes at least better when the load side becomes cooler to some extent. Therefore, the necessary liquid temperature may come to 34° C. If the heat transfer medium liquid having the liquid temperature of 30° C. is supplied to the necessary liquid temperature of 34° C. as mentioned above, the temperature difference between the heat transfer medium liquid c returned to the heat exchange storage tank b and the earth thermal becomes smaller accordingly, thereby generating the problem that the efficiency of heat exchange is not good between the heat transfer medium liquid c and the earth thermal.

Further, a heat exchange device a according to the patent document 2 is provided with a tube body p1 in which the heat transfer medium liquid c flows, for example, as shown in FIG. 20, and is structured such that a pump q1 for circulating the heat transfer medium liquid c in the tube body p1 is interposed in the tube body p1. The tube body p1 is provided with an earth thermal exchanging tube unit r1 which is buried in the ground, and a heat absorption and radiation unit s1 which can radiate heat in a heat exchange region where the heat radiation is required and can absorb heat in a heat exchange region where the heat absorption is required. The earth thermal exchanging tube unit r1 is structured such as to be provided with a U-shaped tube unit which is long in a vertical direction, and the U-shaped tube unit is housed in a vertical hole formed by excavating the ground in the vertical direction so as to extend in the vertical direction, and is set to a buried state in the ground.

According to the heat exchange device a mentioned above, the transfer of heat occurs from a surrounding ground u1 having a relatively higher temperature to the earth thermal exchanging tube unit r1 during the winter season, and the heat transfer medium liquid is temperature increased in a process that the heat transfer medium liquid passes through the earth thermal exchanging tube unit r1. Further, in the heat exchange region where the heat radiation is required, the heat is radiated in the heat absorption and radiation tube unit s1, and the heat transfer medium liquid c flowing in the heat absorption and radiation tube unit s1 is cooled. Further, during the summer season, the heat transfer medium liquid c flowing in the heat absorption and radiation tube unit s1 is temperature increased in the heat exchange region where the heat absorption is required. Further, the potential heat of the heat transfer medium liquid moves to the surrounding ground u1 and the heat transfer medium liquid is cooled in a process of passing through the earth thermal exchanging tube unit r1.

Further, the patent document 2 describes that the cooling and heating operation of the building is carried out in the heat absorption and radiation tube unit s1 in the same manner as in the patent document 1. A problem generated by applying the heat exchange device a having the structure mentioned above for constructing the cooling and heating device is the same as that described in the patent document 1.

CITATION LIST

Patent Literature

PATENT LITERATURE 1: Japanese Unexamined Patent Publication No. 2016-217688
PATENT LITERATURE 2: Japanese Unexamined Patent Publication No. 2017-32218

SUMMARY OF INVENTION

Technical Problem

An object of the present invention is to provide a method of controlling a heat exchange device structured such as to circulate a first heat transfer medium liquid in a heat transfer medium liquid circulation flow channel having a first heat exchange unit which exchanges heat in relation to a second heat exchange unit, and supply a second heat transfer medium liquid to the heat transfer medium liquid circulation flow channel from a heat source which holds the second heat transfer medium liquid having a temperature difference from a temperature of the first heat transfer medium liquid, thereby making effective use of the thermal energy in the heat source when exchanging heat between the first heat exchange unit and the second heat exchange unit, the heat exchange device, and a water-cooled type heat pump device using the heat exchange device.

Solution to Problem

In order to solve the problem mentioned above, the present invention employs the following means.

More specifically, a method of controlling a heat exchange device according to the present invention is a method of controlling a heat exchange device structured such that a flow channel in which a heat transfer medium liquid flows is provided, the flow channel is provided with a heat transfer medium liquid circulation flow channel having a first heat exchange unit which exchanges heat in relation to a second heat exchange unit coming to a load side, a fixed amount of first heat transfer medium liquid circulates in the heat transfer medium liquid circulation flow channel, and an amount of heat exchange in the first heat exchange unit fluctuates due to passage of time on the basis of fluctuation of an amount of heat required by the load side. A necessary amount of second heat transfer medium liquid capable of applying the amount of heat required by the first heat exchange unit is supplied to the heat transfer medium liquid circulation flow channel by a heat source which holds the second heat transfer medium liquid having a temperature difference from the first heat transfer medium liquid, in such a manner that a detected temperature of the first heat transfer medium liquid in an outlet end of the first heat exchange unit maintains a required set temperature in a side where an inlet end of the first heat exchange unit exists. Further, the same amount of the first heat transfer medium liquid as that of the supplied second heat transfer medium liquid is discharged in a side where the outlet end of the first heat exchange unit exists.

A first aspect of a heat exchange device according to the present invention is a heat exchange device structured such that a flow channel in which a heat transfer medium liquid flows is provided, the flow channel is provided with a heat transfer medium liquid circulation flow channel having a first heat exchange unit which exchanges heat in relation to a second heat exchange unit coming to a load side, a fixed amount of first heat transfer medium liquid circulates in the heat transfer medium liquid circulation flow channel by driving a pump attached thereto, and an amount of heat exchange in the first heat exchange unit fluctuates due to passage of time on the basis of fluctuation of an amount of heat required by the load side. The heat exchange device is provided with a feed pipe for setting a heat source which holds a second heat transfer medium liquid having a temperature difference from the first heat transfer medium liquid and the heat transfer medium liquid circulation flow channel in a communication state, the feed pipe is coupled to a side where an inlet end of the first heat exchange unit exists, and a discharge pipe is coupled to a side where an outlet end of the first heat exchange unit exists. Further, the heat transfer device is controlled to supply a necessary amount of the second heat transfer medium liquid capable of applying an amount of heat required by the first heat exchange unit to a side where the inlet end exists via the feed pipe, so that a detected temperature of the first heat transfer medium liquid in the outlet end maintains a required set temperature. Further, the same amount of the first heat transfer medium liquid as that of the supplied second heat transfer medium liquid is discharged from the discharge pipe.

A second aspect of a heat exchange device according to the present invention is a heat exchange device structured such that a flow channel in which a heat transfer medium liquid flows is provided, the flow channel is provided with a heat transfer medium liquid circulation flow channel having a first heat exchange unit which exchanges heat in relation to a second heat exchange unit coming to a load side, a fixed amount of first heat transfer medium liquid circulates in the heat transfer medium liquid circulation flow channel by driving a pump attached thereto, and an amount of heat exchange in the first heat exchange unit fluctuates due to passage of time on the basis of fluctuation of an amount of heat required by the load side. Further, the heat exchange device is provided with a feed pipe for setting a heat source which holds a second heat transfer medium liquid having a temperature difference from the first heat transfer medium liquid and the heat transfer medium liquid circulation flow channel in a communication state, the feed pipe is coupled to a side where an inlet end of the first heat exchange unit exists, and a discharge pipe is coupled to a side where an outlet end of the first heat exchange unit exists. Further, a mixed three-way valve is interposed at a position where the feed pipe or the discharge pipe is coupled to the heat transfer medium liquid circulation flow channel, and the pump is interposed between the mixed three-way valve and the inlet end or between the mixed three-way valve and the outlet end. Further, the mixed three-way valve is controlled to allow a necessary amount of the second heat transfer medium liquid capable of applying an amount of heat required by the first heat exchange unit to flow into the inlet end via the feed pipe, so that a detected temperature of the first heat transfer medium liquid in the outlet end maintains a required set temperature, and the same amount of the first heat transfer medium liquid as that of the supplied second heat transfer medium liquid is discharged from the discharge pipe.

A third aspect of a heat exchange device according to the present invention is a heat exchange device structured such that a flow channel in which a heat transfer medium liquid flows is provided, the flow channel is provided with a heat transfer medium liquid circulation flow channel having a first heat exchange unit which exchanges heat in relation to a second heat exchange unit coming to a load side, a first heat transfer medium liquid circulates in the heat transfer medium liquid circulation flow channel by driving a first pump attached thereto, and an amount of heat exchange in the first heat exchange unit fluctuates due to passage of time on the basis of fluctuation of an amount of heat required by the load side. Further, the heat exchange device is provided with a feed pipe for setting a heat source which holds a second heat transfer medium liquid having a temperature difference from the first heat transfer medium liquid and the heat transfer medium liquid circulation flow channel in a communication state, the feed pipe is coupled to a side where an inlet end of the first heat exchange unit exists, and a discharge pipe is coupled to a side where an outlet end of the first heat exchange unit exists. Further, the heat transfer device is controlled to supply a necessary amount of the second heat transfer medium liquid capable of applying an amount of heat required by the first heat exchange unit to a side where an inlet end of the first heat exchange unit exists via the feed pipe, so that a detected temperature of the first heat transfer medium liquid in the outlet end maintains a required set temperature, on the basis of the driving of the second pump attached to the supply pipe. Further, the same amount of the first heat transfer medium liquid as that of the supplied second heat transfer medium liquid is discharged from the discharge pipe.

A fourth aspect of a heat exchange device according to the present invention is the heat exchange device according to any aspect of the first to third aspects, wherein the heat source is a groundwater collecting storage tank which holds the second heat transfer medium liquid as a groundwater having a temperature difference from the first heat transfer medium liquid, is buried in the ground and always moves the groundwater in and out.

A fifth aspect of a heat exchange device according to the present invention is the heat exchange device according to any aspect of the first to third aspects, wherein the heat source holding the second heat transfer medium liquid having the temperature difference from the first heat transfer medium liquid is a heat exchange storage tank which is buried in the ground.

A sixth aspect of a heat exchange device according to the present invention is the heat exchange device according to any aspect of the first to third aspects, wherein the heat supply source constructing the heat source is selected from a group of groundwater, hot spring discharged water, industrial liquid waste, sewage water waste liquid, river water, lake water, marine water, snow, ice and gas.

A seventh aspect of a heat exchange device according to the present invention is the heat exchange device according to any aspect of the first to third aspects, wherein the second heat transfer medium liquid is a heat transfer medium liquid which is cooled by a cooling tower.

A water-cooled type heat pump cooling and heating device according to the present invention is a water-cooled type heat pump cooling and heating device, wherein the heat exchange device according to any one of the first to third aspects is employed.

A water-cooled type heat pump device according to the present invention is a water-cooled type heat pump device, wherein the heat exchange device according to any one of the first to third aspects is employed.

In the present invention, all of the mediums flowing in the flow channel is the heat transfer medium liquid. However, the first heat transfer medium means the heat transfer medium liquid circulating the heat transfer medium liquid circulation flow channel among the heat transfer medium liquid, and the second heat transfer medium liquid means the heat transfer medium liquid supplied to the first heat exchange unit among the heat transfer medium liquid.

Effect of Invention

The present invention can effectively use the thermal energy in the heat source by circulating the first heat transfer medium liquid in the heat transfer medium liquid circulation flow channel having the first heat exchange unit which exchanges heat in relation to the second heat exchange unit, and supplying the necessary amount of second heat transfer medium liquid capable of applying the amount of heat required by the first heat exchange unit to the heat transfer medium liquid circulation flow channel from the heat source which holds the second heat transfer medium liquid having the temperature difference from the temperature of the first heat transfer medium liquid, thereby exchanging heat between the first heat exchange unit and the second heat exchange unit.

BRIEF DESCRIPTION OF DRAWINGS

FIG. 1A is an explanatory view showing a state in which a heat exchange device constructed by using one pump is applied for constructing a water-cooled type heat pump cooling and heating device and the cooling and heating device carries out a heating operation.

FIG. 1B shows, on a larger scale, a detail of FIG. 1A.

DESCRIPTION OF EMBODIMENTS

Embodiment 1

Figures 1A, 1B:
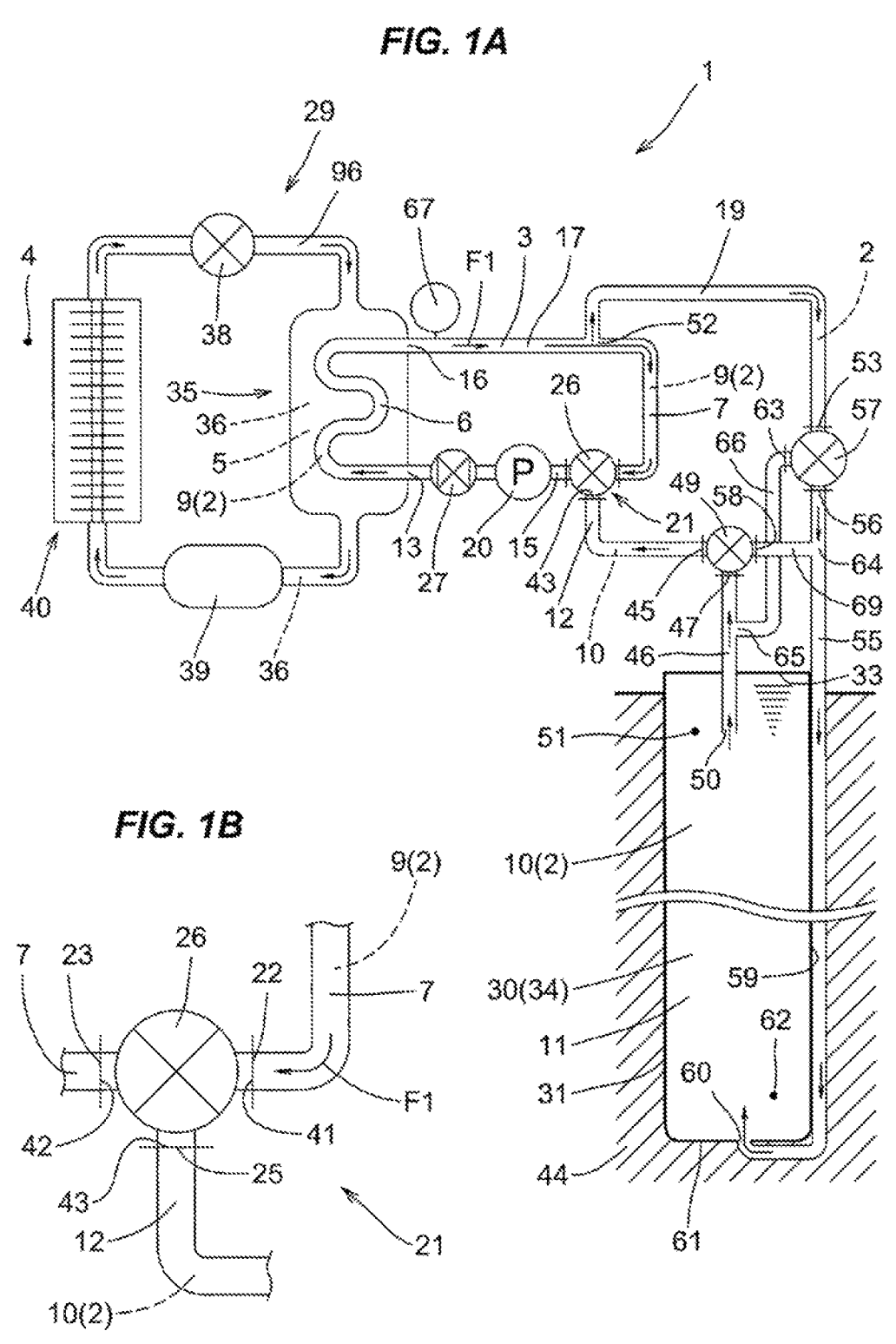
Figure 2:
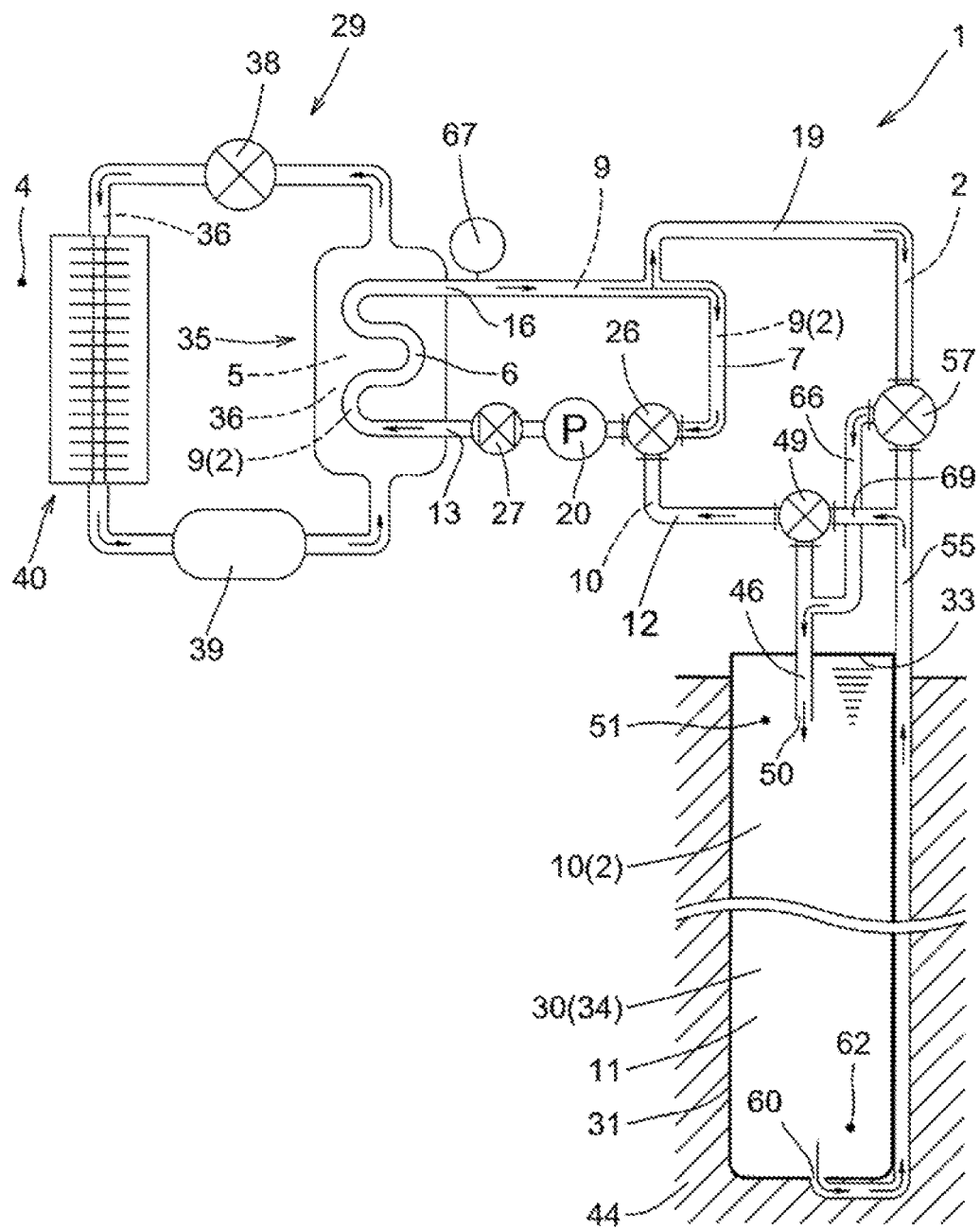
FIG. 2 is an explanatory view showing a state in which the cooling and heating device carries out a cooling operation.

FIG. 1A shows a heat exchange device 1 which carries out a method of controlling a heat exchange device according to the present invention. The heat exchange device 1 is provided with a flow channel 3 in which a heat transfer medium liquid 2 flows, the flow channel 3 is provided with a heat transfer medium liquid circulation flow channel 7 having a first heat exchange unit 6 (of a snaking configuration) which exchanges heat in relation to a second heat exchange unit 5 (containing unit 6) coming to a load side 4, and the heat exchange device 1 is structured such that a fixed amount of first heat transfer medium liquid 9 circulates in the heat transfer medium liquid circulation flow channel 7. Further, the heat exchange device 1 is structured such that an amount of heat exchange in the first heat exchange unit 6 fluctuates with passage of time due to fluctuation of an amount of heat required by the load side 4. Further, a feed pipe 12 is provided so as to make a heat source 11 and the heat transfer medium liquid circulation flow channel 7 in a communication state, the heat source 11 holding a second heat transfer medium liquid 10 which has a temperature difference from the first heat transfer medium liquid 9. The feed pipe 12 is coupled to a side 15 where an inlet end 13 of the first heat exchange unit 6 exists, and a discharge pipe 19 is coupled to a side 17 where an outlet end 16 of the first heat exchange unit 6 exists. Further, a necessary amount of the second heat transfer medium liquid 10 capable of applying an amount of heat required by the first heat exchange unit 6 can be supplied to the side 15 where the inlet end 13 exists via the feed pipe 12 so that a detected temperature of the first heat transfer medium liquid 9 at the outlet end 16 maintains a required set temperature. Further, the same amount of the first heat transfer medium liquid 9 as that of the supplied second heat transfer medium liquid 10 is discharged from the discharge pipe 19. In this case, the first heat transfer medium liquid 9 means the heat transfer medium liquid which circulates in the heat transfer medium liquid circulation flow channel 8 among the heat transfer medium liquid 2, and the second heat transfer medium liquid 10 means the heat transfer medium liquid which is supplied to the first heat exchange unit 6 among the heat transfer medium liquid 2.

In the present embodiment, as shown in FIGS. 1A and 1B, in order to circulate the first heat transfer medium liquid 9 in the heat transfer medium liquid circulation flow channel 7, and discharge the same amount of first heat transfer medium liquid 9 as the supplied heat transfer medium liquid 10, one pump 20 is attached to the heat transfer medium liquid circulation flow channel 7. Further, a mixed three-way valve 26 having first, second and third connecting ports 22, 23 and 25 is interposed at a connection position 21 of the feed pipe 12 to the heat transfer medium liquid circulation flow channel 7, and the pump 20 is interposed between the mixed three-way valve 26 and the inlet end 13. In the present embodiment, an electrically controlled mixed three-way valve is employed as the mixed three-way valve 26. Further, as shown in FIG. 1A, a flow regulating valve 27 is interposed between the pump 20 and the inlet end 13.

A description will be specifically given below of the heat exchange device 1 by exemplifying a case where the heat exchange device 1 is used for constructing a water-cooled type heat pump cooling and heating device (hereinafter, refer also to as a cooling and heating device) 29.

The cooling and heating device 29 utilizes as the heat source an earth thermal which substantially keeps a fixed temperature (for example, about 15° C. in Fukui prefecture) throughout the year. In the following description, the annual average temperature of the earth thermal is specified as 15° C. as a matter of convenience.

The heat source 11 constructing the heat exchange device 1 is formed by using a heat exchange storage tank 30 shown in FIG. 1A. The heat exchange storage tank 30 is formed by covering an inner wall portion of a hole portion provided by excavating the ground to a desired depth (for example, excavating to a depth between 50 and 100 m) with a closed-end cylindrical casing in the present embodiment, and a heat transfer medium liquid 2 is stored in the heat exchange storage tank 30. Further, the heat transfer medium liquid 2 absorbs the earth thermal via a wall portion 31 of the heat exchange storage tank 30, or an amount of heat held by the heat transfer medium liquid 2 is heat radiated to the ground via the wall portion 31. The heat exchange storage tank 30 is constructed as a sealed water tank 34 which is closed in its upper end open portion by a lid member 33 as shown in FIG. 1A in the present embodiment.

The first heat exchange unit 6 and the second heat exchange unit 5 are incorporated in a first heat exchanger 35 which serves, for example, as a plate type heat exchanger having a good heat efficiency. Thus, the heat exchange is carried out between the first heat transfer medium liquid 9 flowing in the first heat exchange unit 6 and a heat pump heat medium 36 flowing in the second heat exchange unit 5 in the first heat exchanger 35, on the basis of the circulation of the first heat transfer medium liquid 9 in the transfer medium liquid circulation flow channel 7.

When the load side 4 is heated by the cooling and heating device 29, the heat transfer medium liquid 2 in which the earth thermal is absorbed in the heat exchange storage tank 30 via the wall portion 31 thereof is carried to the first heat exchange unit 6 by driving the pump 20. In the first heat exchanger 35, the heat is radiated from the heat transfer medium liquid 2 within the first heat exchange unit 6 to the heat pump heat medium 36 passing through an expansion valve 36 and having a low temperature and a low pressure within the second heat exchange unit 5, so that the heat pump heat medium 36 is temperature increased. The heat pump heat medium 36 coming out of the second heat exchange unit 5 is compressed by a compressor 39 so as to be temperature increased, is thereafter condensed by a second heat exchanger 40 provided in the load side 4, is heat exchanged between the heat pump heat medium 36 of the second heat exchanger 40 and the air in the load side 4, and is heat radiated to the load side 4, so that the load side can be heated.

In an opposite manner, when the load side 4 is cooled during the summer season, the heat of the air in the load side is absorbed to the heat pump heat medium 36 by the second heat exchanger 40 as shown in FIG. 2. After the heat pump heat medium 36 is compressed by the compressor 39, the heat pump heat medium 36 is condensed by the first heat exchanger 35 and is heat radiated to the first heat transfer medium liquid 9 within the first heat exchange unit 6. The heat absorbed first heat transfer medium liquid 9 is carried to the heat exchange storage tank 30 by the pressure of the pump 20. In the heat exchange storage tank 30, a potential heat of the heat transfer medium liquid 2 is radiated to a surrounding ground 44 of the heat exchange storage tank 30 via the wall portion 31.

The mixed three-way valve 26 is interposed in the connection position 21 to the heat transfer medium liquid circulation flow channel 7 as shown in FIGS. 1A and 1B, and has the first, second and third connecting ports 22, 23 and 25. The first connecting port 22 is connected to an upstream end 41 of the heat transfer medium liquid circulation flow channel 7 as seen in a circulation direction F1, the second connecting port 23 is connected to a downstream end 42 as seen in the circulation direction F1, and the third connecting port 25 is connected to a supply end 43 of the feed pipe 12. Further, the second connecting port 23 is set to a desired opening degree, for example, a fully opened state, and an opening degree of the first connecting port 22 and an opening degree of the third connecting port 25 are electrically controlled by a valve body (not shown) which is built in the mixed three-way valve 26.

Further, a total amount of an inflow amount of the first heat transfer medium liquid 9 from the first connecting port 22 into the mixed three-way valve 26 and an inflow amount of the second heat transfer medium liquid 10 from the third connecting port 25 into the mixed three-way valve 26, which is obtained by driving the pump 20 is controlled so as to be equal to an outflow amount from the second connecting port 23 into the heat transfer medium liquid circulation flow channel 7 (which is set to 20 L/min by the flow regulating valve 27 as mentioned later in the present embodiment). Further, the first heat transfer medium liquid 9 and the second heat transfer medium liquid 10 are mixed within the mixed three-way valve 26 to form a mixed heat transfer medium liquid, and the mixed heat transfer medium liquid is flowed out to the heat transfer medium liquid circulation flow channel 7 from the second connecting port 23.

Further, the opening degree of the third connecting port 25 is electrically controlled in such a manner that the necessary amount of the second heat transfer medium liquid 10 flows into the mixed three-way valve 26.

The flow regulating valve 27 is provided for regulating a supply amount of the pump 20 to a flow amount required by the heat transfer medium liquid circulation flow channel 7 in the present embodiment, and the flow amount is regulated to 20 L/min in the present embodiment.

Further, as shown in FIG. 1A, an upper end 47 of a first tube body 46 is coupled to a connection end 45 of the feed pipe 12 in an opposite side to the supply end 43 via a first three-way switching valve 49 for switching the flow channel. The first tube body 46 extends in a vertical direction and a lower end opening 50 thereof is open in an upper portion 51 of the heat transfer medium liquid 2 which is stored in the heat exchange storage tank 30. Further, an upper end 56 of a second tube body 55 is coupled to a connection end 53 of the discharge pipe 19 in an opposite side to a connection end 52 for the heat transfer medium liquid circulation flow channel 7 via a second three-way switching valve 57 for switching the flow channel. The second tube body 55 extends downward along an outer surface 59 of the heat exchange storage tank 30, and a lower end opening 60 thereof is coupled to a lower end 61 of the heat exchange storage tank 30. According to this structure, the lower end opening 60 is set to a state in which the lower end opening 60 is open in a lower portion 62 of the heat transfer medium liquid 2 which is stored within the heat exchange storage tank 30. Further, the remaining connecting port 63 of the second three-way switching valve 57 and an upper position of the first tube body 46 are coupled by a first connecting tube 66 for switching. Further, the remaining connecting port 58 of the first three-way switching valve 49 and an upper position of the second tube body 55 are coupled by a second connecting tube 69 for switching.

The flow direction of the heat transfer medium liquid 2 flowing in the first tube body 46 and the second tube body 55 can be switched, as shown by arrows in FIGS. 1A and 2 at a junction 64 (FIG. 1A) between the second tube body 55 and the second connecting tube 69 and at a junction 65 (FIG. 1A) between tube body 46 and the first connecting tube 66, between a case where the cooling and heating device 29 is used for heating and a case where the cooling and heating device 29 is used for cooling, on the basis of the switching action of the flow channel by means of the first and second three-way switching valves 49 and 57.

This switching is carried out by taking into consideration the fact that the temperature of the heat transfer medium liquid 2 housed in the heat exchange storage tank 30 is higher in the upper portion 51 and lower in the lower portion 62. In a case where the cooling and heating device 29 is used for heating on the basis of the flow channel switching, the heat transfer medium liquid 2 sucked by the lower end opening 50 of the first tube body 46 and having the high temperature in the upper portion 51 is supplied as the second heat transfer medium liquid 10 to the supply end 43 as shown in FIG. 1A. In conjunction with this, the first heat transfer medium liquid 9 discharged out of the discharge pipe 19 and having the low temperature is discharged at a lower end opening 60 of the second tube body in the lower portion 62.

In an opposite manner, in a case where the cooling and heating device 29 is used for cooling, as shown in FIG. 2, the heat transfer medium liquid 2 sucked at the lower end opening 60 of the second tube body 55 and having the low temperature in the lower portion 62 is supplied to the feed pipe 12, and the first heat transfer medium liquid 9 discharged out of the discharge pipe 19 and having the high temperature is discharged at the lower end opening 50 of the first tube body 46 in the upper portion 51.

When the second heat transfer medium liquid 10 is supplied to the heat transfer medium liquid circulation flow channel 7 as mentioned above, the same amount of first heat transfer medium liquid 9 as the amount of the supplied second heat transfer medium liquid 10 is returned into the heat exchange storage tank 30 from the heat transfer medium liquid circulation flow channel 7 via the discharge pipe 19 on the basis of an extruding action of the heat transfer medium liquid by the pump 20. Further, since the heat exchange storage tank 30 is constructed as a sealed water tank 34, the second heat transfer medium liquid 10 can be smoothly sucked by driving the pump 20 owing to the pressure increase in the sealed water tank 34 caused by the first heat transfer medium liquid 9 flowing into the heat exchange storage tank 30. The sucked second heat transfer medium liquid 10 is mixed with the first heat transfer medium liquid 9 which flows into the mixed three-way valve 26 from the first connecting port 22 (FIG. 1B) by the mixed three-way valve 26, and the mixed heat transfer medium liquid is supplied at 20 L/min to the heat transfer medium liquid circulation flow channel 7 from the second connecting port 23 (FIG. 1B).

The necessary amount of the second heat transfer medium liquid 10 is set so that a detected temperature of the first heat transfer medium liquid 9 maintains a required set temperature at an outlet end 16 of the first heat exchange unit 7. In other words, the necessary amount is set so that the first heat exchange unit 5 can apply an amount of heat which is necessary moment to moment.

In order to set the necessary amount, the mixed three-way valve 26 is electrically controlled by a detected signal obtained by a temperature detector which is provided at the outlet end 16. For example, in a case where a predetermined circulation volume required by the cooling and heating device 29 is set to 20 L/min and the required set temperature of the first heat transfer medium liquid 9 is set to 2° C. at the outlet end 16 when the cooling and heating device 29 is used for heating, the necessary amount of second heat transfer medium liquid 10 is supplied to the inlet end 13 so that the detected temperature of the first heat transfer medium liquid 9 maintains the required set temperature 2° C. at the outlet end 16.

The necessary liquid temperature at the inlet end 13 of the first heat exchange unit 6 required for maintaining the required set temperature 2° C. at the outlet end 16 is assumed to be 7° C. when starting the cooling and heating device 29. For this purpose, the heat transfer medium liquid 2 within the heat exchange storage tank 30 heated by the earth thermal and having the temperature of 15° C. is supplied as the second heat transfer medium liquid 10 to the first heat transfer medium liquid 9 which circulates in the heat transfer medium liquid circulation flow channel 7. According to this structure, the necessary liquid temperature 7° C. at the inlet end 13 can be secured.

Thereafter, when the load side 4 warms up to some extent, the amount of heat exchange in the first heat exchange unit 6 may be reduced. At this time, if the necessary liquid temperature at the inlet end 13 required for the detected temperature of the first heat transfer medium liquid 9 at the outlet end 16 maintaining the required set temperature 2° C. is set to 3° C., the necessary amount of the second heat transfer medium liquid 10 may be reduced in comparison with the initial one. Since the mixed three-way valve 26 is electrically controlled by the temperature detected signal by means of the temperature detector 67 provided at the outlet end 16, the necessary amount is automatically set. The electric control of the mixed three-way valve 26 means electrically controlling an opening degree of the first connecting port 22 and an opening degree of the third connecting port 25 by means of the valve body as mentioned above. Thereafter, the closer the load side 4 comes to the set temperature, the more the necessary amount is further reduced. However, the necessary amount is desirably set by electrically controlling the mixed three-way valve in the same manner.

Further, in a case where the predetermined circulation volume required by the cooling and heating device 29 is set to 20 L/min, and the required set temperature of the first heat transfer medium liquid 9 at the outlet end 16 is set to 35° C. when the cooling and heating device 29 is used for cooling, the necessary amount of the second heat transfer medium liquid 10 controlled so that the detected temperature of the first heat transfer medium liquid 9 at the outlet end 16 maintains the required set temperature is supplied to the inlet end 13.

The necessary liquid temperature of the inlet end 13 required for maintaining the required set temperature 35° C. at the outlet end 16 when activating the cooling and heating device 29 is set to 30° C. For this purpose, the heat transfer medium liquid 2 within the heat exchange storage tank 30 is supplied to the first heat transfer medium liquid 9 circulating in the heat transfer medium liquid circulation flow channel 17, the heat transfer medium liquid 2 being cooled by the earth thermal and having the temperature of 15° C., so that the necessary liquid temperature 30° C. at the inlet end 16 is secured. Thereafter, when the load side 4 is cooled to some extent, the amount of heat exchange in the first heat exchange unit 6 may be reduced. In this case, on the assumption that the necessary liquid temperature at the inlet end 13 required for the detected temperature of the first heat transfer medium liquid 9 at the outlet end 16 to maintain the required set temperature is 34° C., the necessary amount of the second heat transfer medium liquid 10 can be reduced in comparison with the initial amount. This necessary amount is automatically set by the electrical control of the mixed three-way valve 26 on the basis of the temperature detected signal by means of the temperature detector 67 which is provided at the outlet end 16. Thereafter, the closer the load side 4 comes to the set temperature, the more the necessary amount is reduced. However, the necessary amount is desirably set by the electrical control of the mixed three-way valve in the same manner.

In a case where the water is employed as the first heat transfer medium liquid 9 and the second heat transfer medium liquid 10 when the heat exchange device 1 is used as the cooling and heating device 29 so as to heat the load side as mentioned above, the required set temperature is preferably set to 2° C. The control method of the heat exchange device 1 having the structure mentioned above controls so that the detected temperature of the first heat transfer medium liquid 9 at the outlet end 16 maintains the required set temperature by supplying the necessary amount of second heat transfer medium liquid 10 to the first heat exchange unit 6. However, the detected temperature somewhat fluctuates. Therefore, if the required temperature is set to 0° C. or 1° C., the temperature at the outlet end 16 may go below 0° C. In this case, there is a risk that the first heat transfer medium liquid 9 within the first exchange unit 7 freezes. Therefore, the required set temperature is preferably set to 2° C. for safety so as to prevent the heat transfer medium liquid 2 flowing out of the first heat exchange unit 6 from freezing. In a case where an antifreeze liquid is used as the heat transfer medium liquid, the required set temperature may be set to 0° C. or less.

In the present embodiment, as shown in FIG. 1A, the first heat transfer medium liquid 9 discharged out of the discharge pipe 19 is returned into the heat exchange storage tank 30. However, the temperature of the heat transfer medium liquid 2 corresponding to the first heat transfer medium liquid 9 flowing into the heat exchange storage tank 30 is low. As a result, a temperature difference is great between the temperature of the heat transfer medium liquid 2 flowing thereinto and the earth thermal. Therefore, the heat transfer medium liquid 2 within the heat exchange storage tank 30 can be efficiently heat exchanged with the earth thermal.

A description will be given here of a state in which the amount of heat held by the second heat transfer medium liquid 10 stored in the heat exchange storage tank 30 is consumed, a state in which the heat transfer medium liquid 2 returned into the heat exchange storage tank 30 and having the low temperature is heated little by little by the transfer of heat in the earth thermal via the wall portion 31 of the heat exchange storage tank 30, and a state in which the heat transfer medium liquid 2 returned into the heat exchange storage tank 30 and having the high temperature is cooled little by little by the transfer of heat in the heat exchange storage tank 30 via the wall portion 31 to the surrounding ground 44.

In a case where the heat exchange device 1 is applied to the cooling and heating device 29 and the cooling and heating device 29 carries out the heating operation, the transfer of heat from the surrounding ground 44 having a relatively high temperature to the heat exchange storage tank 30 occurs and the heat transfer medium liquid 2 within the heat exchange storage tank 30 is heated little by little when the cooling and heating device 29 is under an operation stop state, for example, during the night. As a result, if a time for which the heat exchange device 1 is under the stop state is equal to or longer than a fixed time, the entire temperature of the stored heat transfer medium liquid 2 can come to 15° C. which is equal to the ground temperature. The lower the temperature of the heat transfer medium liquid 2 returning into the heat exchange storage tank 30 as mentioned above is, that is, the greater the temperature difference between the temperature of the heat transfer medium liquid 2 flowing thereinto and the earth thermal is, the more effectively the heat of the earth thermal can be collected.

In order to positively take the amount of heat used during the day in from the surrounding ground during the night when the cooling and heating device 29 is under the operation stop state, any flow preferably exists in the heat transfer medium liquid 2 within the heat exchange storage tank 30. For example, the heat transfer medium liquid 2 can be moved up and down while bringing the heat transfer medium liquid 2 into contact with the inner surface of the heat exchange storage tank 30 as much as possible by circulating the heat transfer medium liquid 2 on the basis of driving of a circulation pump. As a result, it is possible to improve a moving efficiency of the earth thermal to the stored heat transfer medium liquid 2 and a heat transfer efficiency from the stored heat transfer medium liquid 2 to the surrounding ground 44.

The amount of heat reserved in the heat transfer medium liquid 2 within the heat exchange storage tank 30 is consumed little by little by operating the heat exchange device 1 during the day as mentioned above. However, the necessary amount of the second heat transfer medium liquid 10 supplied to the inlet end 13 of the first heat exchange unit 6 is set in such a manner that the detected temperature of the first heat transfer medium liquid 9 at the outlet end 16 of the heat exchange unit 6 maintains the required set temperature. Therefore, an amount per unit time of the second heat transfer medium liquid 10 supplied to the first heat exchange unit 6 can be reduced.

In a case where the heat exchange device 1 is applied to the cooling and heating device 29 as one example, the heat supply amount to the heating load side 4 is much, for example, about 15 minutes from starting the heating operation. As a result, the amount of the second heat transfer medium liquid 10 fed from the heat exchange storage tank 30 to the first heat exchange unit 6 is much. However, when the load side 4 thereafter warms up to some extent, the amount of heat exchange in the first heat exchange unit 6 can be reduced. For example, even if the necessary liquid temperature of the inlet end 13 is initially required to be 7° C. and the necessary amount thereof is initially 20 L/min, the necessary amount may be 5 L/min or less when the load side 4 is going to warm up to some extent. According to this matter, it is possible to circulate the heat transfer medium liquid 2 within the heat exchange storage tank 30 in the flow channel 3 for a long time period (for example, for about 3 or 4 hours). As a result, it is possible to consume the storage of heat held by the heat transfer medium liquid 2 within the heat exchange storage tank 30 for a long time period.

The storage of heat is reduced little by little, however, the temperature of the heat transfer medium liquid 2 returning into the heat exchange storage tank 30 is low as mentioned above, so that the temperature difference is great between the temperature of the heat transfer medium liquid 2 flowing thereinto and the earth thermal. As a result, it is possible to efficiently exchange heat between the heat transfer medium liquid 2 flowing into the heat exchange storage tank 30 and the earth thermal as mentioned above. Further, since the heat transfer medium liquid 2 within the heat exchange storage tank 30 circulates for a long time period as mentioned above, the heat transfer medium liquid 2 returning into the heat exchange storage tank 30 at the lower portion 62 can collects the heat of the earth thermal for a long time period. For the reason as mentioned above, according to the heat exchange device 1, it is possible to utilize the amount of the stored heat for a long time period, and it is possible to utilize the amount of heat of the heat transfer medium liquid 2 which returns into the heat exchange storage tank 30 and is heated by the earth thermal for a long time period.

Therefore, after the storage of heat within the heat exchange storage tank 30 circulates and is consumed, it is possible to utilize the heat transfer medium liquid which is sufficiently heated by the earth thermal over time, that is, the amount of heat of the heat transfer medium liquid 2 under a state of sufficiently absorbing the earth thermal. Accordingly, it is possible to utilize the amount of heat included in the heat transfer medium liquid 2 within the heat exchange storage tank 30 for a long time period.

These matters are applied in the same manner to a case where the heat exchange device 1 is applied to the cooling and heating device 29 and the cooling and heating device 29 is employed for the cooling operation, and are applied in the same manner to a case where the heat exchange device 1 is employed, for example, in a hot water machine or a refrigerating machine which uses a water-cooled type heat pump.

Embodiment 2

Figure 3:
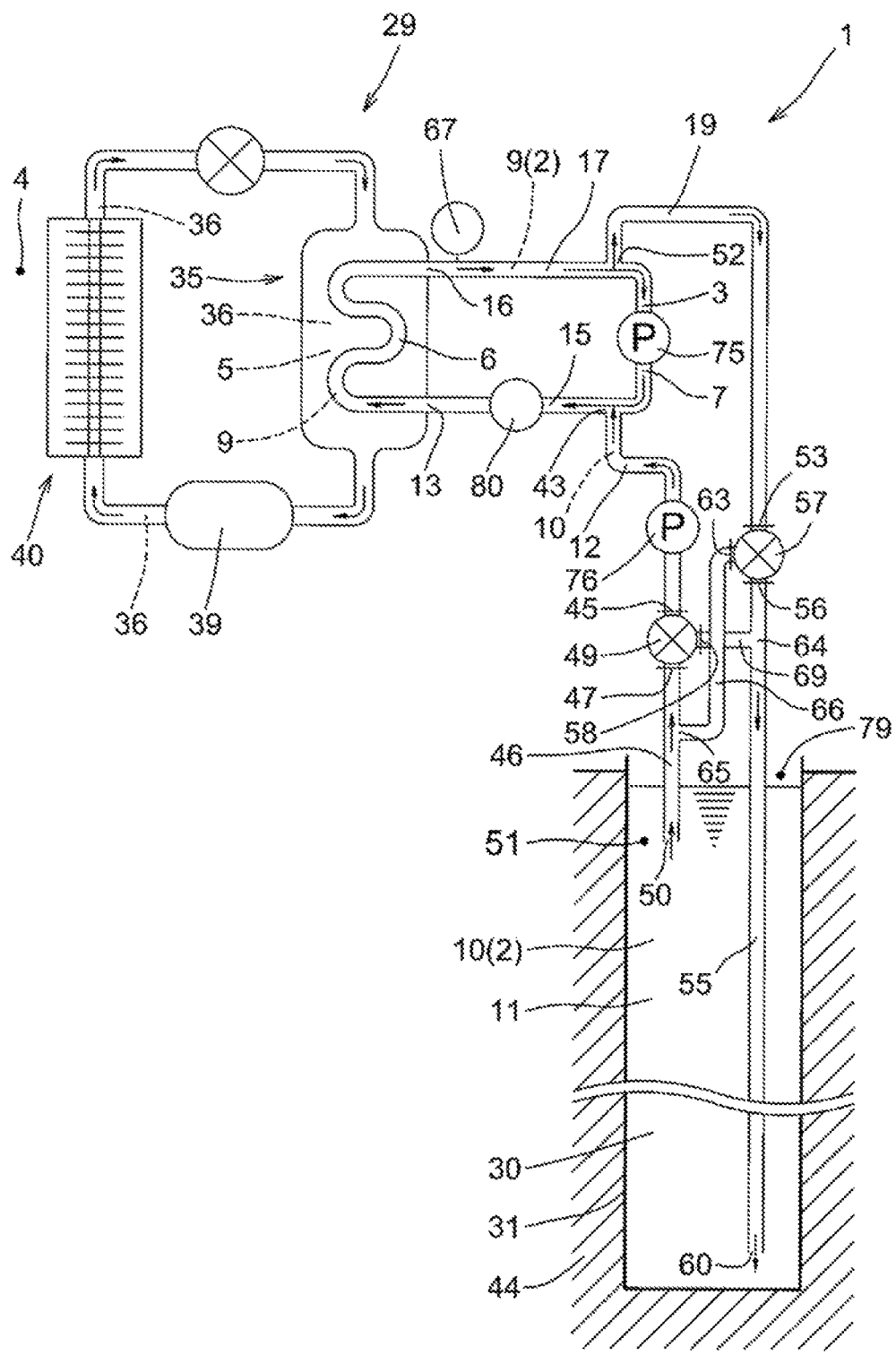
FIG. 3 is an explanatory view showing a state in which a heat exchange device constructed by using two pumps is employed for constructing a water-cooled type heat pump cooling and heating device and the cooling and heating device carries out a heating operation.
Figure 4:
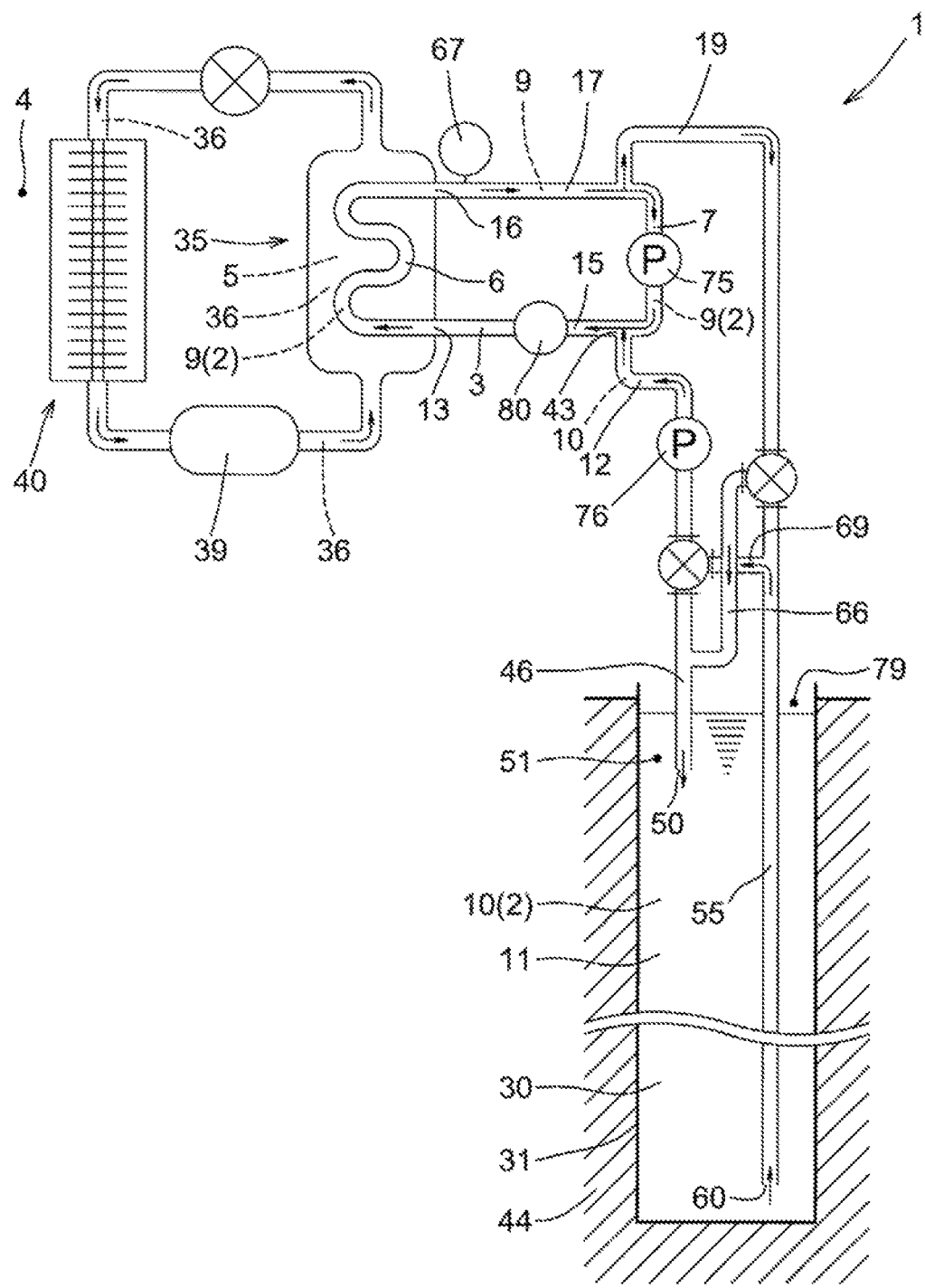
FIG. 4 is an explanatory view showing a state in which the cooling and heating device carries out a cooling operation.

FIGS. 3 to 4 show the other embodiment of the heat exchange device 1 which executes the method of controlling the heat exchange device according to the present invention. The heat exchange device 1 is provided with a flow channel 3 in which the heat transfer medium liquid 2 flows, and the flow channel 3 is provided with a heat transfer medium liquid circulation flow channel 7 having a first heat exchange unit 6 which exchanges heat in relation to a second heat exchange unit 5. The heat transfer medium liquid circulation flow channel 7 is structured such that the first heat transfer medium liquid 9 circulates therein by driving a first pump 75 which is attached to the heat transfer medium liquid circulation flow channel 7. Further, it is provided with a heat source 11 which holds a second heat transfer medium liquid 10 having a temperature difference from the first heat transfer medium liquid 9, and is provided with a feed pipe 12 which sets the heat source 11 and the heat transfer medium liquid circulation flow channel 7 in a communication state. Further, the feed pipe 12 is coupled to a side 14 where an inlet end 13 of the first heat exchange unit 6 exists, and a discharge pipe 19 is coupled to a side 17 where an outlet end 16 of the first heat exchange unit 6 exists. The heat source 11 is constructed by employing a heat exchange storage tank 30 buried in the ground in the same manner as that of the embodiment 1.

Further, a necessary amount of second heat transfer medium liquid 10 capable of applying an amount of heat required by the first heat exchange unit 6 is controlled to be capable of being supplied to a side 15 where the inlet end 13 of the first heat exchange unit 6 exists, via the feed pipe 12, by driving a second pump 76 attached to the feed pipe 12, in such a manner that a detected temperature of the first heat transfer medium liquid 9 at the outlet end 16 maintains a required set temperature. Further, the same amount of first heat transfer medium liquid 9 as that of the supplied second heat transfer medium liquid 10 is discharged out of the discharge pipe 19. Here, the first heat transfer medium liquid 9 means the heat transfer medium liquid which circulates in the heat transfer medium liquid circulation flow channel 7 among the heat transfer medium liquid 2, and the second heat transfer medium liquid 10 means the heat transfer medium liquid which is supplied to the first heat exchange unit 6 among the heat transfer medium liquid 2.

Taking as an example a case where the heat exchange device 1 is used for constructing a water-cooled type heat pump device 29 for a cooling and heating operation, this case can be achieved by replacing the mixed three-way valve 26 shown in FIG. 1A describing the embodiment 1 with the first pump 75 and the second pump 76 which are inverter controlled. Since an operation and effect of the cooling and heating device 29 having the structure mentioned above is the same as that described in the embodiment 1, a specific description thereof will be omitted.

In FIGS. 3 to 4, same reference numerals are attached to portions which are in common with FIG. 1A. In FIGS. 3 to 4, the upper end 79 of the heat exchange storage tank 30 is opened as is different from the case in FIG. 1A. Further, reference numeral 80 in FIGS. 3 to 4 denotes a flow rate detector. The heat exchange device 1 according to the present embodiment can be also applied, for example, to a hot water machine or a refrigerating machine which employs the water-cooled type heat pump.

Embodiment 3

Figure 5:
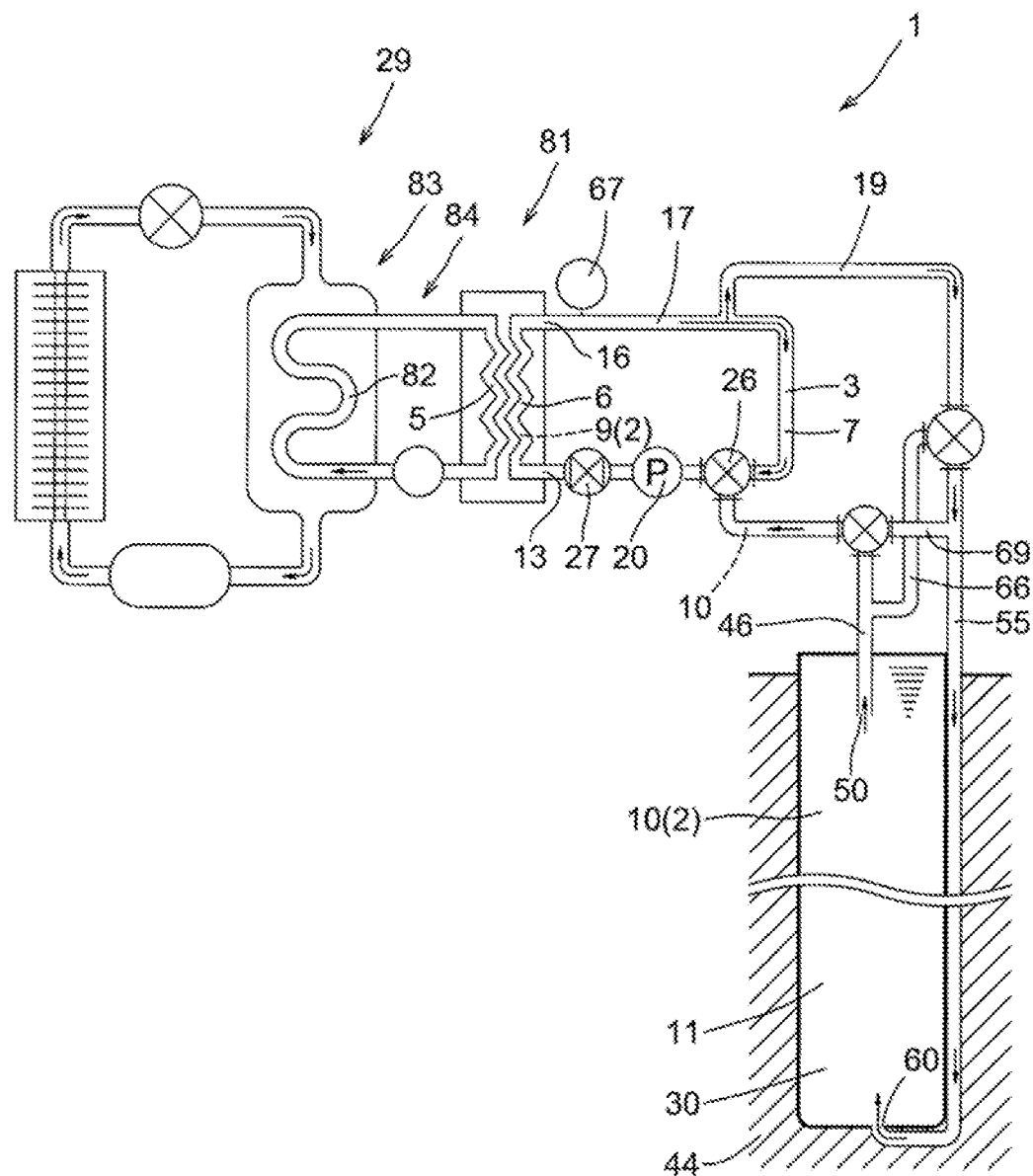
FIG. 5 is an explanatory view showing a state in which a heat exchange device constructed by using one pump is applied to a cooling and heating device by using an attached heat exchanger and carries out a heating operation.

FIG. 5 shows an embodiment in a case where the heat exchange device 1 according to the present invention is applied to a water-cooled type heat pump cooling and heating device 29 which is commonly sold currently. The water-cooled type heat pump cooling and heating device 29 has collected heat from the heat transfer medium liquid supplied from the external heat source by lowering the temperature of the heat medium of the heat exchanger installed within the heat pump to a temperature less than a freezing point, for raising the efficiency to the maximum, in a case where it is used for heating. Therefore, the heat transfer medium liquid necessarily uses an antifreeze liquid so as to prevent the heat transfer medium liquid from freezing in the heat exchanger. However, it is necessary to restrict a used amount of the antifreeze liquid since the antifreeze liquid is generally expensive. Further, in a case where the external heat source employs an earth thermal exchanger utilizing the earth thermal, for example, the heat exchange storage tank 30, not only it is necessary to house a lot of antifreeze liquid in the earth thermal exchange and a high cost is required, but also there is a problem that leakage of the antifreeze liquid into the ground may cause a ground pollution. According to these matters, in the case where the earth thermal exchanger is used as the external heat source, the heat transfer medium liquid 2 housed therein is preferably water.

FIG. 5 shows a case where an attached heat exchanger 81 such as a plate type heat exchanger having a good heat efficiency is provided between the heat exchange device 1 having the structure mentioned above and the water-cooled type heat pump cooling and heating device 29 for heating while using the conventional water-cooled type heat pump cooling and heating device 36. In the attached heat exchanger 81, there are arranged the first heat exchange unit 6 of the heat exchange device according to the present invention, and the second heat exchange unit 5 which forms a part of an antifreeze liquid circulation flow channel 84 constructed by having a heat exchange unit 82 arranged in a heat exchanger 83 which is installed within the heat pump. Further, it is structured such that the heat exchange is carried out between the first heat exchange unit 6 in which the water flows, and the second heat exchange unit 5 in which the antifreeze liquid flows. In FIG. 5, the structure is constructed by applying the heat exchange device 1 using one pump 20, for example, shown by the embodiment 1, however, may be constructed by applying the heat exchange device 1 using two pumps, for example, shown by the embodiment 2.

The heat exchange in the case constructed as mentioned above is carried out in the same manner as that described in the embodiment 1 and the embodiment 2. For example, the necessary amount of the second heat transfer medium liquid 10 required by the first heat exchange unit 6 is supplied from the heat source 11 in such a manner that the detected temperature of the first heat transfer medium liquid 9 at the outlet end 16 of the first heat exchange unit 6 of the heat exchange device 1 maintains the required set temperature, for example, 2° C. so as to prevent the temperature of the antifreeze liquid from coming to a minus temperature. In conjunction with this, the same amount of first heat transfer medium liquid 9 as that of the supplied second heat transfer medium liquid 10 is discharged in the side 17 where the outlet end 16 of the first heat exchange unit 6 exists.

In the case constructed as mentioned above, an amount of the antifreeze liquid is extremely small amount since the antifreeze liquid is used for in the antifreeze liquid circulation flow channel 84. Therefore, it is possible to simultaneously solve both the problem in cost associated with the antifreeze liquid and the problem in the ground pollution. The heat exchange device 1 according to the present embodiment can be also applied, for example, to a hot water machine and a refrigerating machine using the water-cooled type heat pump.

Embodiment 4

Figure 6:
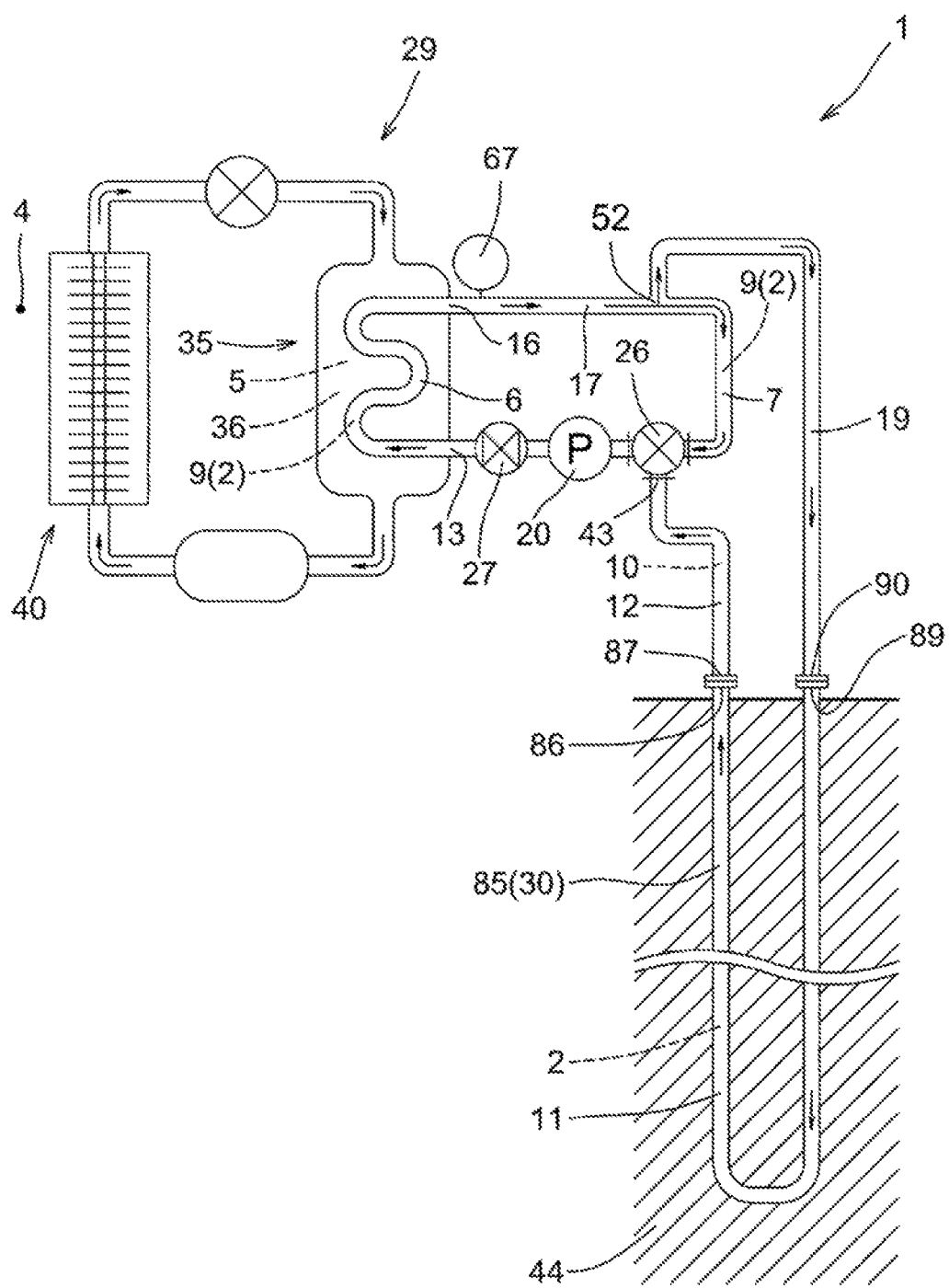
FIG. 6 is an explanatory view describing a heat exchange device constructed by using a vertically long U-shaped tube unit as a heat exchange storage tank, in a case where one pump is used.
Figure 7:
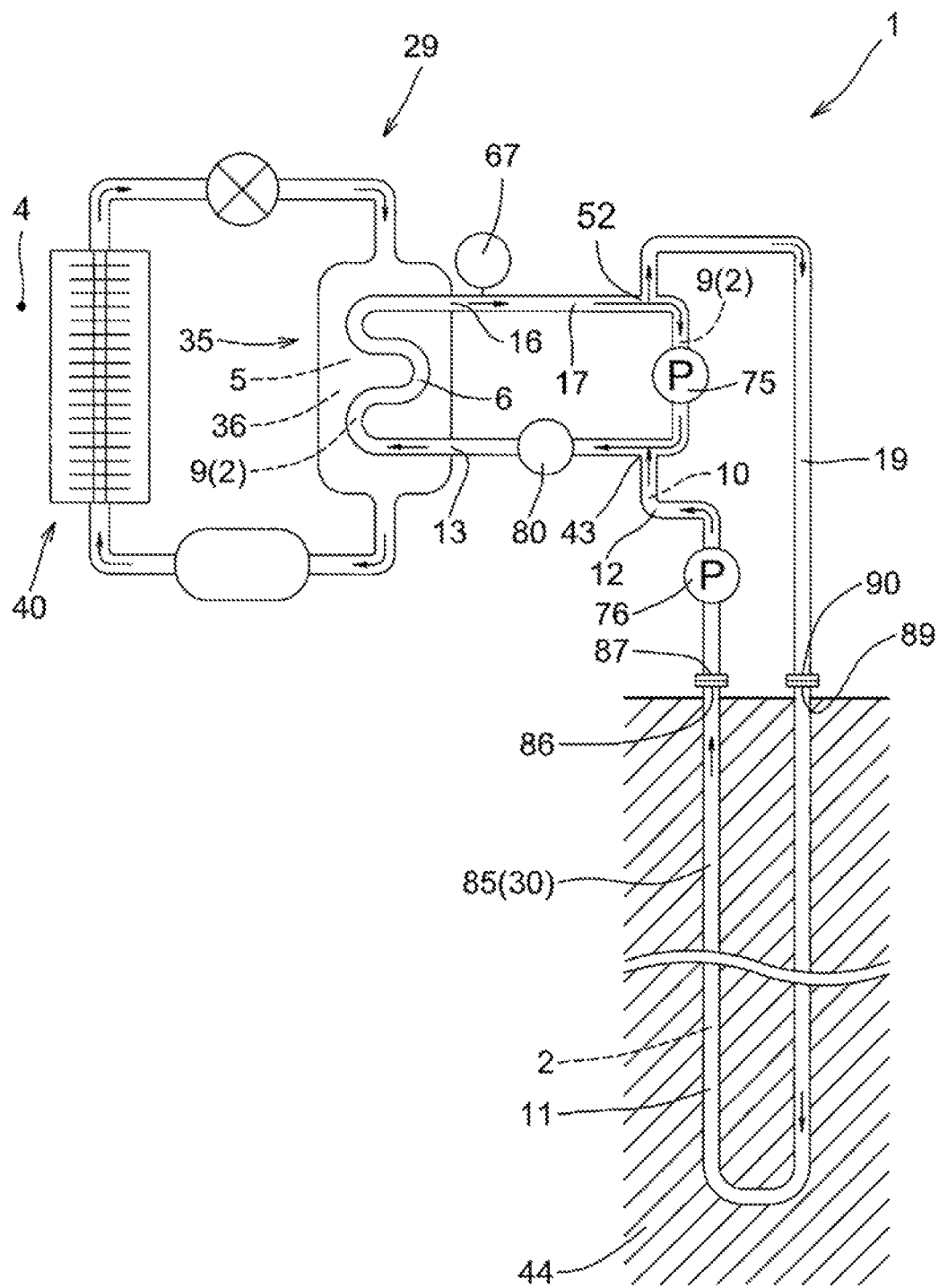
FIG. 7 is an explanatory view describing the heat exchange device constructed by using the vertically long U-shaped tube unit as the heat exchange storage tank, in a case where two pumps are used.
Figure 8:
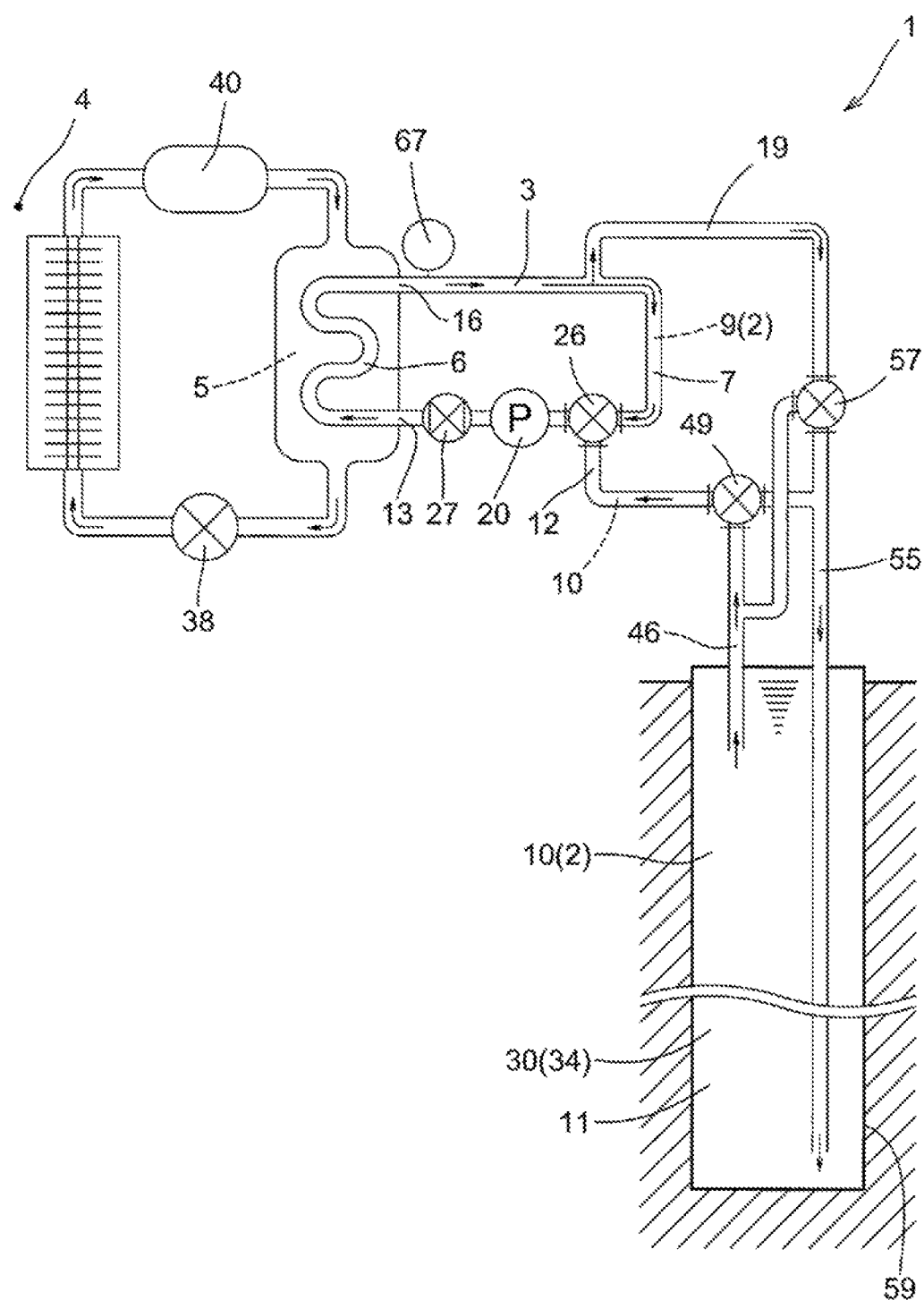
FIG. 8 is an explanatory view showing the other embodiment of a heat exchange device constructed by using a sealed water tank as a heat source.
Figure 9:
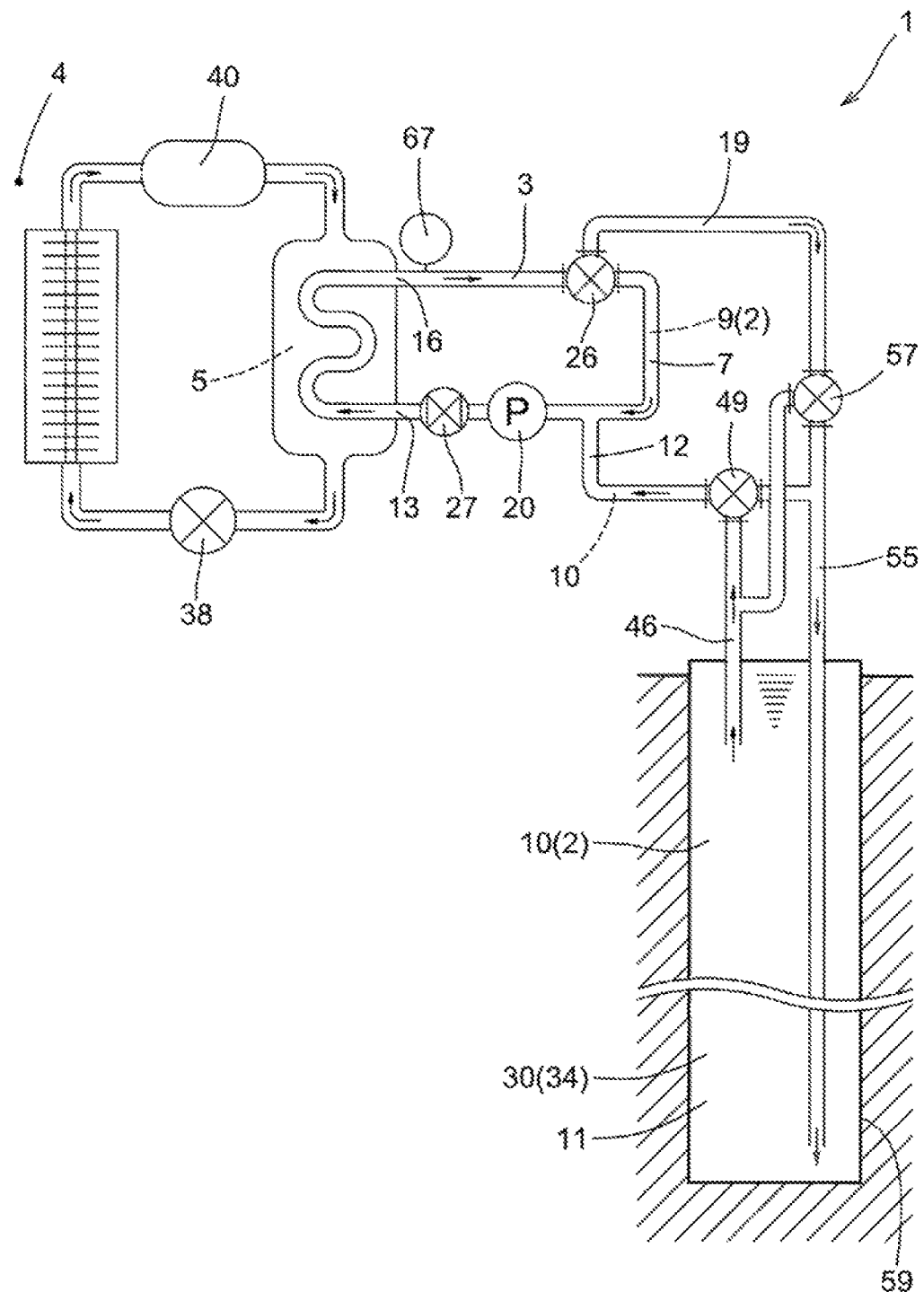
FIG. 9 is an explanatory view showing the other embodiment of the heat exchange device constructed by using the sealed water tank as the heat source.
Figure 10:
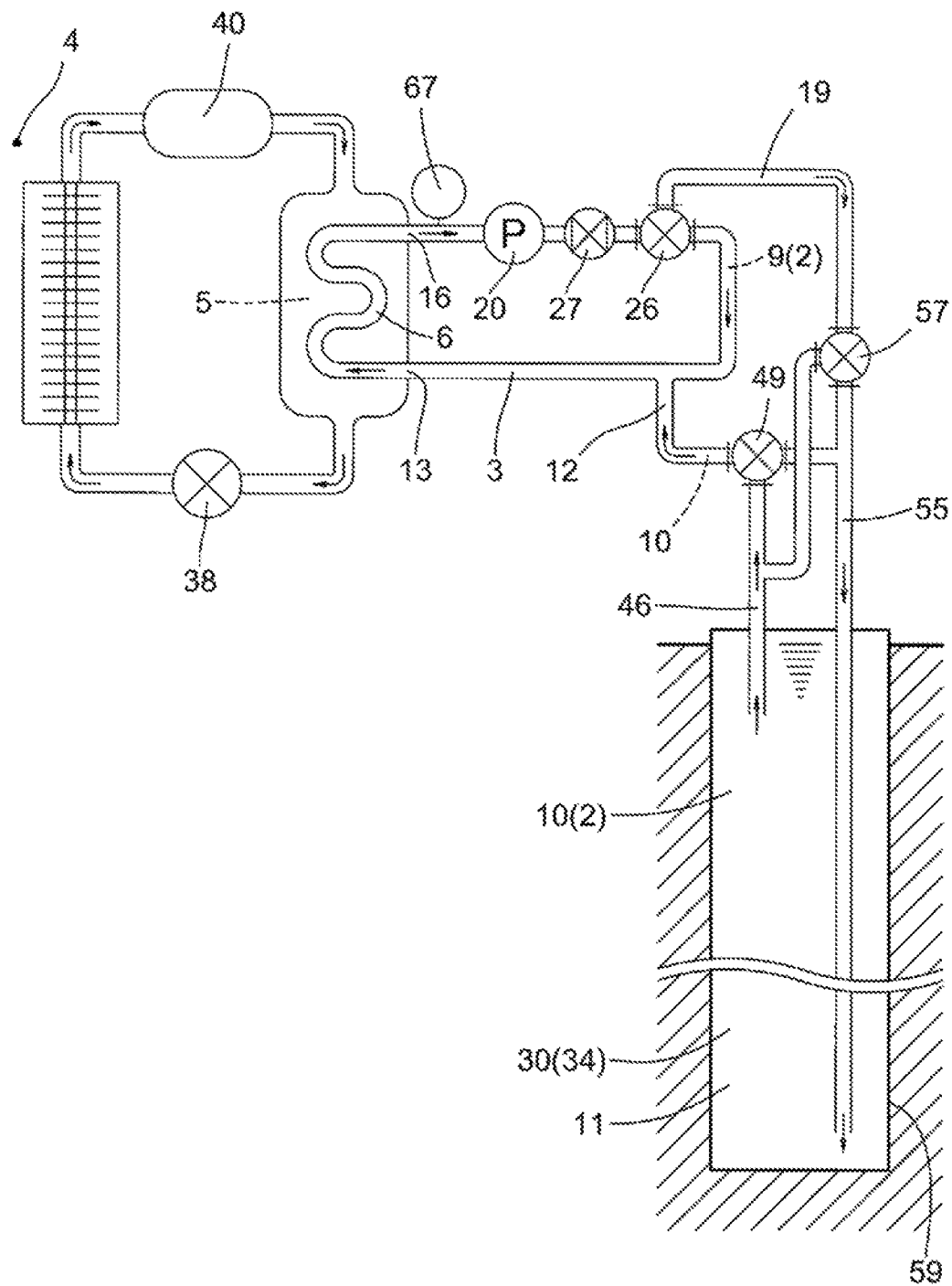
FIG. 10 is an explanatory view showing the other embodiment of the heat exchange device constructed by using the sealed water tank as the heat source.
Figure 11:
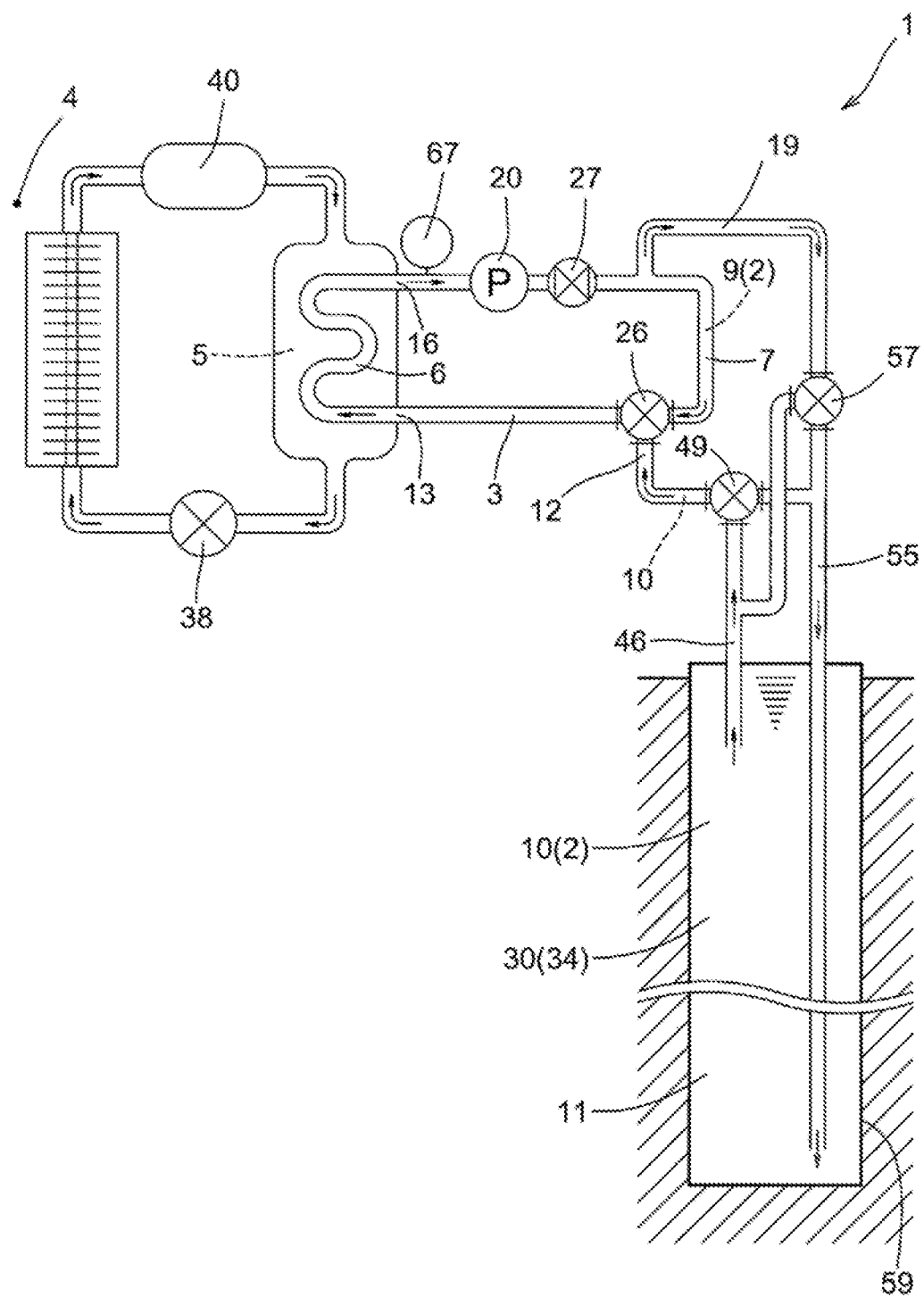
FIG. 11 is an explanatory view showing the other embodiment of the heat exchange device constructed by using the sealed water tank as the heat source.
Figure 12:
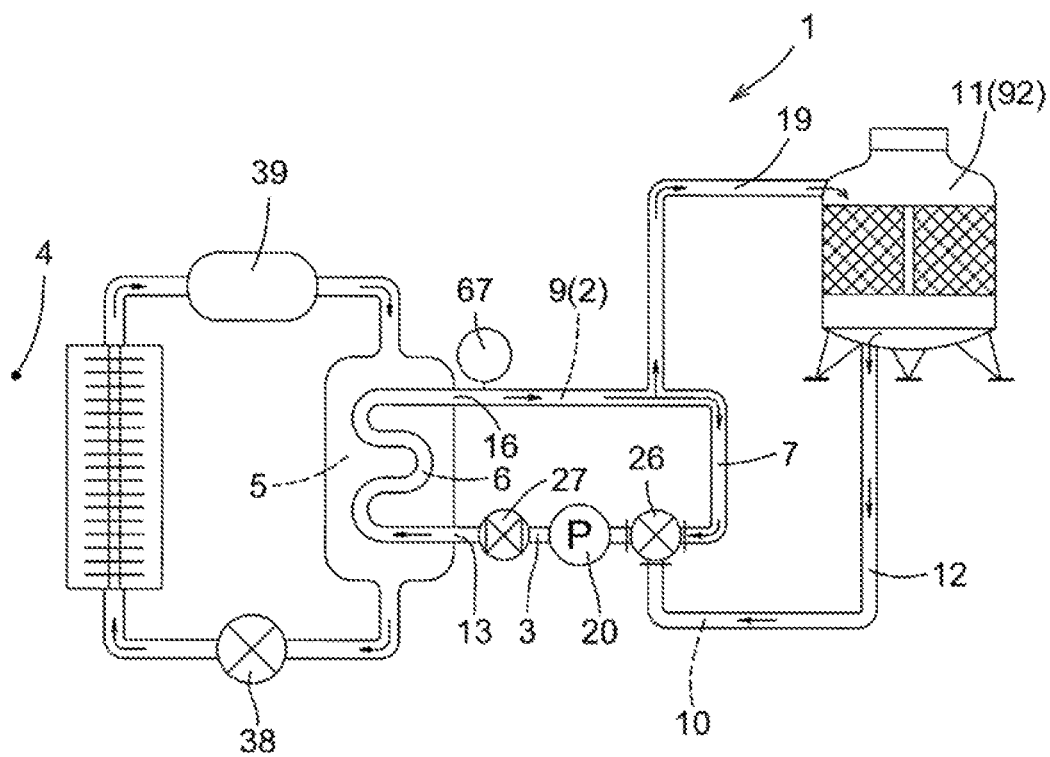
FIG. 12 is an explanatory view showing an embodiment of a heat exchange device constructed by using a cooling tower as the heat source.
Figure 13:
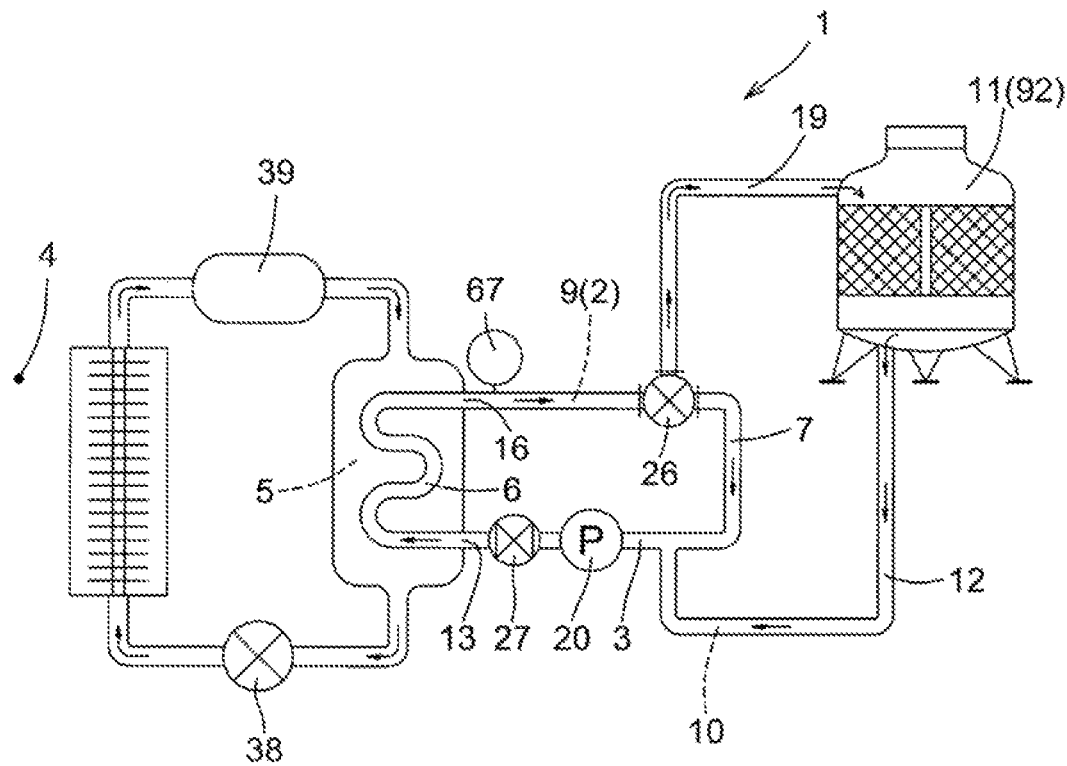
FIG. 13 is an explanatory view showing the other embodiment of the heat exchange device constructed by using the cooling tower as the heat source.
Figure 14:
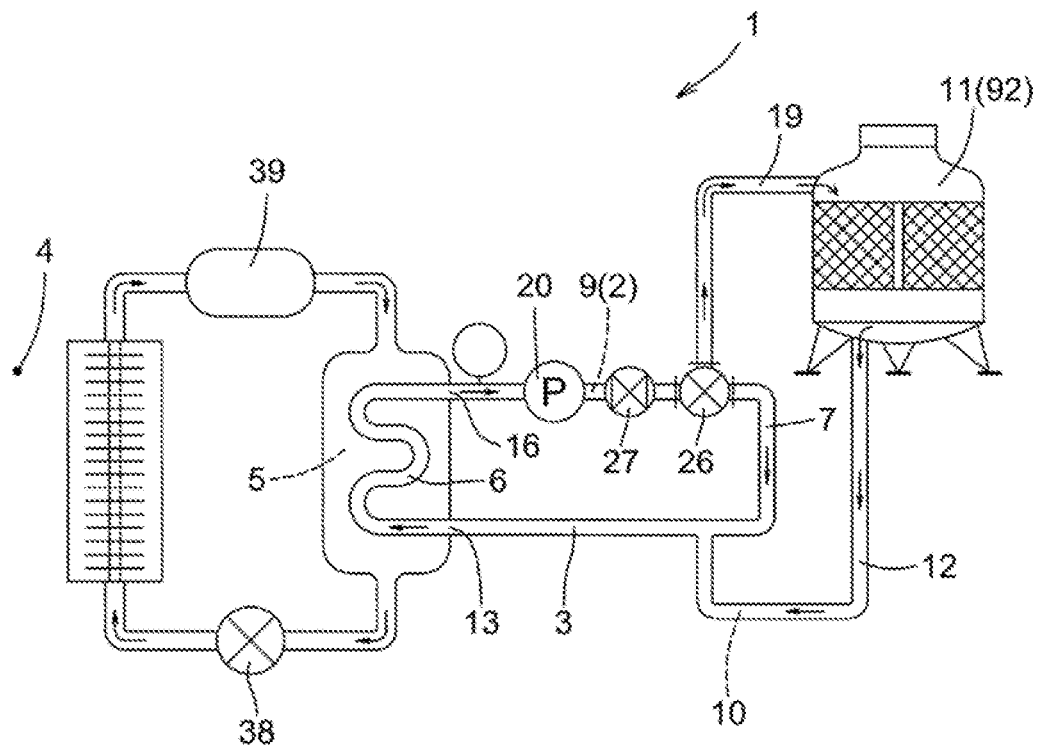
FIG. 14 is an explanatory view showing the other embodiment of the heat exchange device constructed by using the cooling tower as the heat source.
Figure 15:
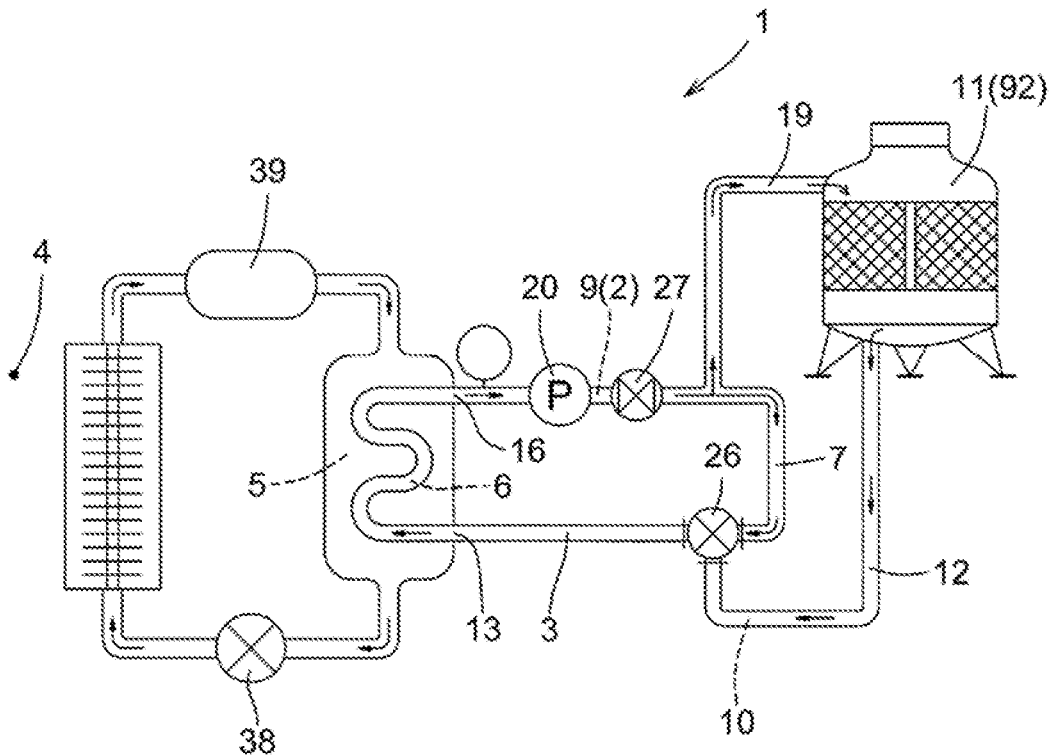
FIG. 15 is an explanatory view showing the other embodiment of the heat exchange device constructed by using the cooling tower as the heat source.

FIGS. 6 and 7 show an example of the heat exchange device 1 provided with the heat source 11 in which the heat exchange storage tank 30 constructed as a vertically long U-shaped tube unit 85 is provided. The U-shaped tube unit 85 is buried within a vertical hole formed by excavating the ground in a vertical direction, so that a length direction thereof extends in the vertical direction, and the heat transfer medium liquid 2 is stored within the U-shaped tube unit 85. Further, one end 86 of the U-shaped tube unit 85 is coupled to a connection end 87 of the feed pipe 12 in an opposite side to the supply end 43, and the other end 89 of the U-shaped tube unit 85 is coupled to a connection end 90 of the discharge pipe 19 in an opposite side to the connection end 52 relative to the side 17 where the outlet end 16 exists.

The heat exchange device 1 according to FIG. 6 is structured such that the necessary amount of heat transfer medium liquid 2 within the heat exchange storage tank 30 is supplies as the second heat transfer medium liquid 10 to the inlet end 13 by driving the pump 20 in such a manner that the detected temperature of the first heat transfer medium liquid 9 at the outlet end 16 maintains the required set temperature. Further, the heat exchange device 1 according to FIG. 7 is structured such that the necessary amount of heat transfer medium liquid 2 within the U-shaped tube unit 85 is supplied as the second heat transfer medium liquid 10 to the inlet end 13 by driving the second pump 76 in such a manner that the detected temperature of the first heat transfer medium liquid 9 at the outlet end 16 maintains the required set temperature.

Further, the same amount of first heat transfer medium liquid 9 as the second heat transfer medium liquid 10 supplied as mentioned above is returned to the U-shaped tube unit 85 via the discharge pipe 19. The U-shaped tube unit 85 having the structure mentioned above may be set, for example, to a state in which the U-shaped tube unit 85 is immersed under the heat transfer medium liquid stored in a closed-end hole portion which is provided in a plie buried in the ground. In this case, a desired heat exchange is carried out between the heat transfer medium liquid within the U-shaped tube unit 85, and the stored heat transfer medium liquid 2. Since the other structures of the heat exchange device 1 mentioned above and an intended use thereof, and an operation and effect are the same as those described in the embodiment 1 and the embodiment 2, a specific description thereof will be omitted.

Embodiment 5

FIGS. 8 to 11 show the other embodiment of the heat exchange device 1 according to the present invention, in which an arranged state of a whole or a part of the second tube body 55, the pump 20, the mixed three-way valve 26 and the flow regulating valve 27 is changed in a case where the heat source 11 holding the second heat transfer medium liquid 10 is constructed by using the heat exchange storage tank 30 serving as the sealed water tank 34 described in the embodiment 1. In FIGS. 8 to 11, the second tube body 55 is extended downward within the sealed water tank 34.

Each of these heat exchange devices 1 is a heat exchange device provided with the flow channel 3 in which the heat transfer medium liquid 2 flows, and structured such that the flow channel 3 is provided with the heat transfer medium liquid circulation flow channel 7 having the first heat exchange unit 6 which exchanges heat in relation to the second heat exchange unit 5 serving as the load side, a fixed amount of first heat transfer medium liquid 9 is circulated into the heat transfer medium liquid circulation flow channel 7 by driving the pump 20 attached thereto, and the amount of heat exchange in the first heat exchange unit 6 fluctuates on the basis of passage of time due to fluctuation of the amount of heat required by the load side 4, in FIGS. 8 to 11.

Further, it is provided with the feed pipe 12 which sets the heat source 11 holding the second heat transfer medium liquid 10 having the temperature difference from the temperature of the first heat transfer medium liquid 9 and the heat transfer medium liquid circulation flow channel 7 in the circulation state, the feed pipe 12 is coupled to the side where the inlet end 13 of the first heat exchange unit 6 exists, and the discharge pipe 19 is coupled to the side where the outlet end 16 of the first heat exchange unit 6 exists. Further, it is controlled so as to supply the necessary amount of the second heat transfer medium liquid 10 capable of applying the amount of heat required by the first heat exchange unit 6 to the side where the inlet end 13 exists via the feed pipe 12, in such a manner that the detected temperature of the first heat transfer medium liquid 9 at the outlet end 16 maintains the required set temperature. Further, the same amount of the first heat transfer medium liquid 9 as the supplied second heat transfer medium liquid 10 is discharged out of the discharge pipe 19.

These heat exchange devices 1 can be applied, for example, to the cooling and heating device, the hot water machine or the refrigerating machine using the water-cooled type heat pump. In the preset embodiment, as long as the heat exchange storage tank 30 is the sealed water tank 34, the second tube body 55 may be housed in the sealed water tank 34, and may extend downward along an outer surface 59 (FIG. 8) of the sealed water tank 34, and a lower end opening thereof may be coupled to a lower end of the sealed water tank 34. In FIGS. 8 to 11, same reference numerals are attached to positions which are in common with FIG. 1A.

Embodiment 6

FIGS. 12 to 15 show the other embodiment of the heat exchange device 1 according to the present invention, which is applied for constructing the water-cooled type heat pump cooling and heating device 29.

In the present embodiment, the heat source 11 is constructed by using a cooling tower 92, and the heat transfer medium liquid 2 cooled by the cooling tower 92 is set to the second heat transfer medium liquid 10. The structure of the heat source 11 is a different point from the case in the heat exchange device 1 described in the embodiments 1 to 5.

Each of the heat exchange devices 1 according to FIGS. 12 to 15 is provided with the flow channel 3 in which the heat transfer medium liquid 2 flows, and is structured such that the flow channel 3 is provided with the heat transfer medium liquid circulation flow channel 7 having the first heat exchange unit 6 which exchanges heat in relation to the second heat exchange unit 5 serving as the load side 4, and a fixed amount of first heat transfer medium liquid 9 is circulated into the heat transfer medium liquid circulation flow channel 7 by driving the pump 20 attached thereto. Further, it is structured such that the amount of heat exchange in the first heat exchange unit 6 fluctuates on the basis of passage of time due to fluctuation of the amount of heat required by the load side 4. Further, it is provided with the feed pipe 12 which sets the heat source 11 holding the second heat transfer medium liquid 10 having the temperature difference from the temperature of the first heat transfer medium liquid 9 and the heat transfer medium liquid circulation flow channel 7 in a communication state, and the feed pipe 12 is coupled to the side where the inlet end 13 of the first heat exchange unit 6 exists. Further, the discharge pipe 19 is coupled to the side where the outlet end 16 of the first heat exchange unit 6 exists, and is controlled so as to supply the necessary amount of the second heat transfer medium liquid 10 capable of applying the amount of heat required by the first heat exchange unit 6 to the side where the inlet end 13 exists via the feed pipe 12 in such a manner that the detected temperature of the first heat transfer medium liquid 9 at the outlet end 16 maintains the required set temperature, and the same amount of the first heat transfer medium liquid 9 as the supplied second heat transfer medium liquid 10 is discharged out of the discharge pipe 19.

A description will be in detail given below of this. The cooling tower 92 is utilized as a heat source for the water-cooled type cooling device and the water-cooled type refrigerating machine, and is a device for cooling the heat transfer medium liquid by water evaporation heat. Since the cooling tower 92 utilizes the evaporation heat so as to cool, the cooling tower 92 can cool the heat transfer medium liquid to be equal to or lower than an atmospheric temperature in a case where a humidity is low. It can be expressed as a dry-bulb temperature and a wet-bulb temperature. For example, the water temperature under the environment of atmospheric temperature 30° C. (dry-bulb temperature) and humidity 70% is lowered to 25.5° C. (wet-bulb temperature) to the maximum. The cooling tower is set to the heat source for the cooling device and the refrigerating machine by utilizing this phenomenon.

In a case where a residential indoor or a freezing chamber is cooled by the cooling device or the refrigerating machine having the structure mentioned above, the cooling device or the refrigerating machine is operated at the maximum output at the beginning since a difference between a set temperature and a room temperature is great. Then, the temperature difference between the set temperature and the room temperature is reduced little by little, and the output of the device does not require the maximum output and comes to an output corresponding to only an amount of heat lost to the outdoor environment. It is assumed that an amount of the heat transfer medium liquid supplied from the cooling tower 92 is 20 L/min and a water temperature thereof is 32° C., and the amount of heat at 5° C. is discharged to the heat transfer medium liquid and is returned to the cooling tower 92 at 37° C. at the maximum output operating time. In this case, as mentioned above, it is assumed that the room temperature comes close to the set temperature little by little, and the first heat exchange unit 6 comes to a state in which the first heat exchange unit 6 only uses the amount of heat at 1° C. in 20 L/min. A description will be given below of an advantage of the heat exchange device 1 according to the present embodiment in this state in comparison with the conventional heat exchange device utilizing the cooling tower.

In the case of the conventional cooling tower, if 20 L/min of the heat transfer medium liquid is returned to the cooling tower, and is cooled at 5° C. in relation to the air by the evaporation, the heat transfer medium liquid will be sent at 28° C. when being returned at 33° C. When the prosecution is progressed further, for example, in a case where the environment around the cooling tower is 30° C. in the atmospheric temperature and 70% in the humidity mentioned above, the water temperature of the circulating water getting out of the cooling tower is lowered to the wet-bulb temperature 25.5° C. and is returned at 26.5° C. Here, if the atmospheric temperature is 30° C., the heat transfer medium liquid is lowered to the atmospheric temperature or less. As a result, transfer of heat from the air occurs, and an amount of water required for cooling on the basis of the evaporation is increased.

On the contrary, according to the present invention, when the cooling tower 92 is used under the same condition, the water temperature of the heat transfer medium liquid getting out of the heat pump is 37° C. and the amount of the heat transfer medium liquid returning to the cooling toward is 4 L/min. the evaporation amount for cooling 4 L/min heat transfer medium liquid having the temperature of 37° C. to 32° C. is one fifth of the amount in a case where 20 L/min heat transfer medium liquid having the temperature of 33° C. is cooled to 28° C. since the heat transfer medium liquid is also cooled by the air, so that the amount of the evaporated water can be widely reduced, thereby efficiently cooling to 32° C. or less by adding the cooling operation by the ambient air. As mentioned above, according to the present invention, it is possible make effective use of the thermal energy in the cooling tower (the heat source).

Embodiment 7

The present invention is not limited to the structures shown in the embodiments mentioned above, but can be variously modified by those skilled in the art.

(1) It is desired to further improve the cooling efficiency at the cooling time in a case where the heat exchange device 1 is applied to the water-cooled type heat pump cooling and heating device. In this case, the efficiency of heat exchange between the first heat exchange unit 6 and the second heat exchange unit 5 should be further improved. For this purpose, the flow direction of the first heat transfer medium liquid 9 in the first heat exchanger 35 is set to an opposite direction to the flow direction of the heat pump heat medium 36. According to this structure mentioned above, the inlet end 13 and the outlet end 16 are at opposite positions in the first heat exchange unit 6, and the temperature detector 67 is accordingly provided in each of the outlet ends 16. The inversion of the flow directions mentioned above can be achieved, for example, by providing a three-way switching valve in the heat transfer medium liquid circulation flow channel 7 and carrying out a desired switching operation of the three-way switching valve.

The heat source 11 can be constructed by using the heat exchange storage tank 30 employing the pile buried in the ground and storing the heat transfer medium liquid 2 in the closed-end hole portion provided along an axis of the pile.

(2) In the present invention, "the detected temperature of the first heat transfer medium liquid 9 at the outlet end 16 of the first heat exchange unit 6" is the detected temperature of the first heat transfer medium liquid 9 at the outlet end 16, and may be a detected temperature of the first heat transfer medium liquid 9 at a position which is away from the outlet end 16, as long as the position can measure the same temperature as the temperature at the outlet end 16.

(3) The heat exchange storage tank 30 constructing the heat exchange device 1 may be constructed as a storage tank for collecting the groundwater which the ground water can always move in and out. In this case, the ground water collecting storage tank in which the groundwater is always in a stored state constructs itself the heat source 11, and the stored groundwater corresponds to the heat transfer medium liquid 1 which can be the second heat transfer medium liquid 10. In the case of constructing as mentioned above, the first heat transfer medium liquid 9 discharged in the side where the outlet end 16 of the first heat exchange unit 6 exists can be returned, for example, to a reinjection well. Alternatively, the first heat transfer medium liquid 9 can be housed in a water storage tank and can be utilized as the water for snow melting. In a case where the heat exchange device 1 is constructed by using the groundwater collecting storage tank, a used amount of the groundwater can be reduced, so that an environmental problem such as a ground subsidence due to reduction of the groundwater is hard to be generated.

Figure 16:
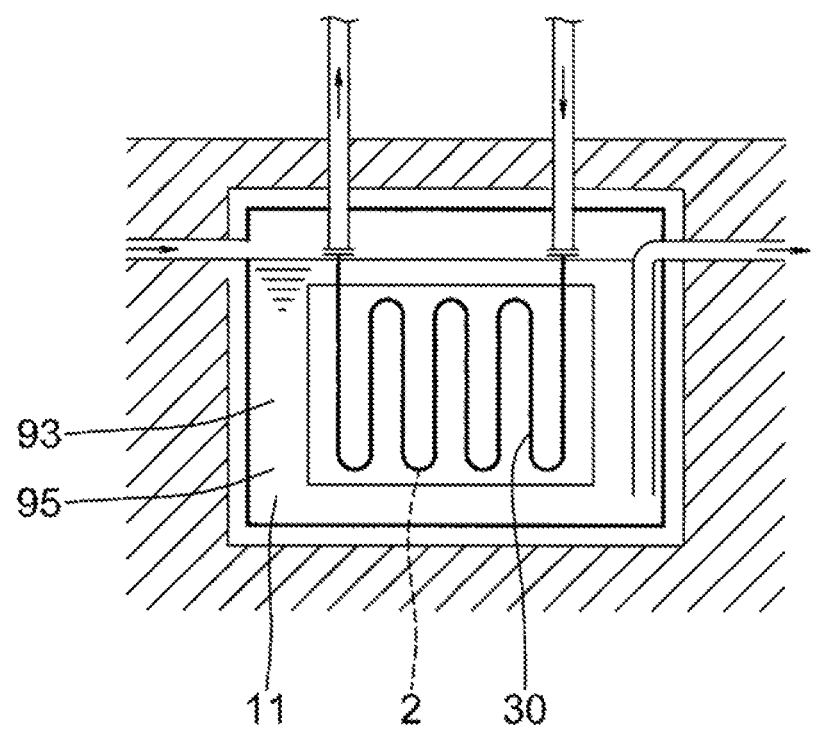
FIG. 16 is an explanatory view describing a heat exchange device constructed by using a waste liquid such as a hot spring discharged water, an industrial liquid waste and a sewage water as a heat supply source constructing the heat source.

(4) The heat source 11 constructing the heat exchange device 1 may be constructed by using a storage tank 95 storing a liquid 93 such as a hot spring discharged water, an industrial liquid waste and a sewage water waste liquid as the heat supply source, for example, as shown in FIG. 16. In the case of being constructed as mentioned above, it is possible to make effective use of the amount of heat held by the hot spring discharged water, the industrial liquid waste or the sewage water waste liquid which is wastefully discarded, for example, by collecting heat thereof via the heat exchange storage tank 30 serving as a meandering tube unit. In this case, the heat transfer medium liquid 2 within the heat exchange storage tank 30 is the second heat transfer medium liquid 10 held by the heat source 11.

(5) The other heat supply source constructing the heat source 11 may be a solid material or a gas material such as river water, lake water, marine water, snow, ice and gas as long as the heat supply source has a temperature difference from the temperature of the first heat transfer medium liquid 9. Since the applied field of the heat exchange device 1 using the heat source mentioned above is the same as that described in the embodiment 1 and the embodiment 2, a specific description thereof will be omitted.

(6) In order to improve a heating efficiency in a case where the heat exchange device 1 according to the present invention is used for heating, for example, with reference to FIG. 1A, the heat is collected from the heat transfer medium liquid 2 flowing in the first heat exchange unit 6 by lowering the temperature of the heat pump heat medium 36 flowing in the second heat exchange unit 5 provided within the first heat exchanger (for example, a plate type heat exchanger) 35 which is installed in the heat pump circulation channel 96 (having a valve 38) to the freezing point or less (for example, lowering to −14° C. to −15° C.). For this purpose, it is necessary to prevent the heat transfer medium liquid 2 flowing in the first heat exchange unit 6 from freezing in the first heat exchange unit 6.

Therefore, it is considered to use the antifreeze liquid as the heat transfer medium liquid 2. However, the antifreeze liquid is expensive and may cause a problem of an environmental pollution in a case where the antifreeze liquid leaks into the environment such as the ground. It is thought that the problem mentioned above can be dissolved by using the water as the heat transfer medium liquid 2. However, in a case where the water is used as the heat transfer medium liquid 2, there is a risk that the water is frozen while the water flows in the flow channel 3 of the first heat exchange unit 6 and the frozen water clogs the flow channel 3. Such being the case, in the case where the water is used as the heat transfer medium liquid 2, a means for preventing the water from being frozen in the flow channel of the first heat exchange unit 6 is required.

Figure 17:
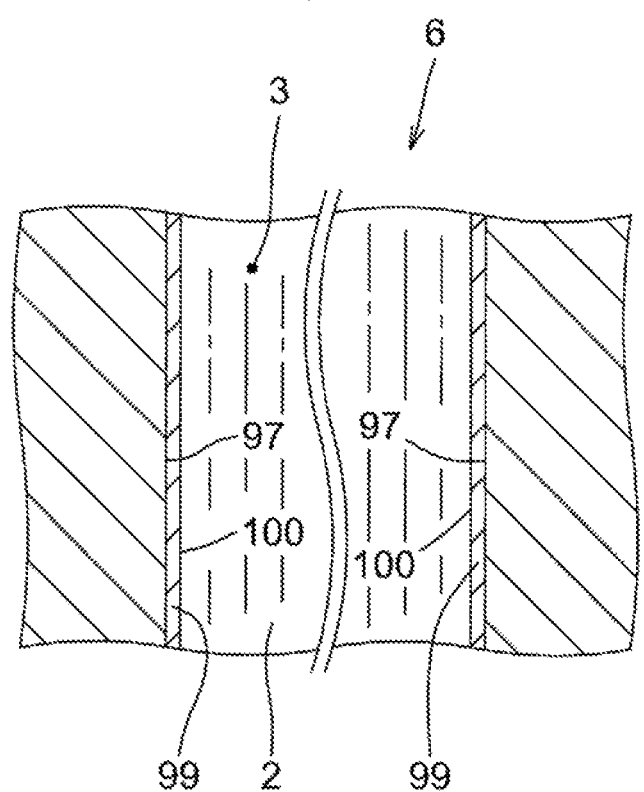
FIG. 17 is a cross sectional view showing a flow channel of a first heat exchange unit which is covered with a water-repellent coating film.
Figure 18:
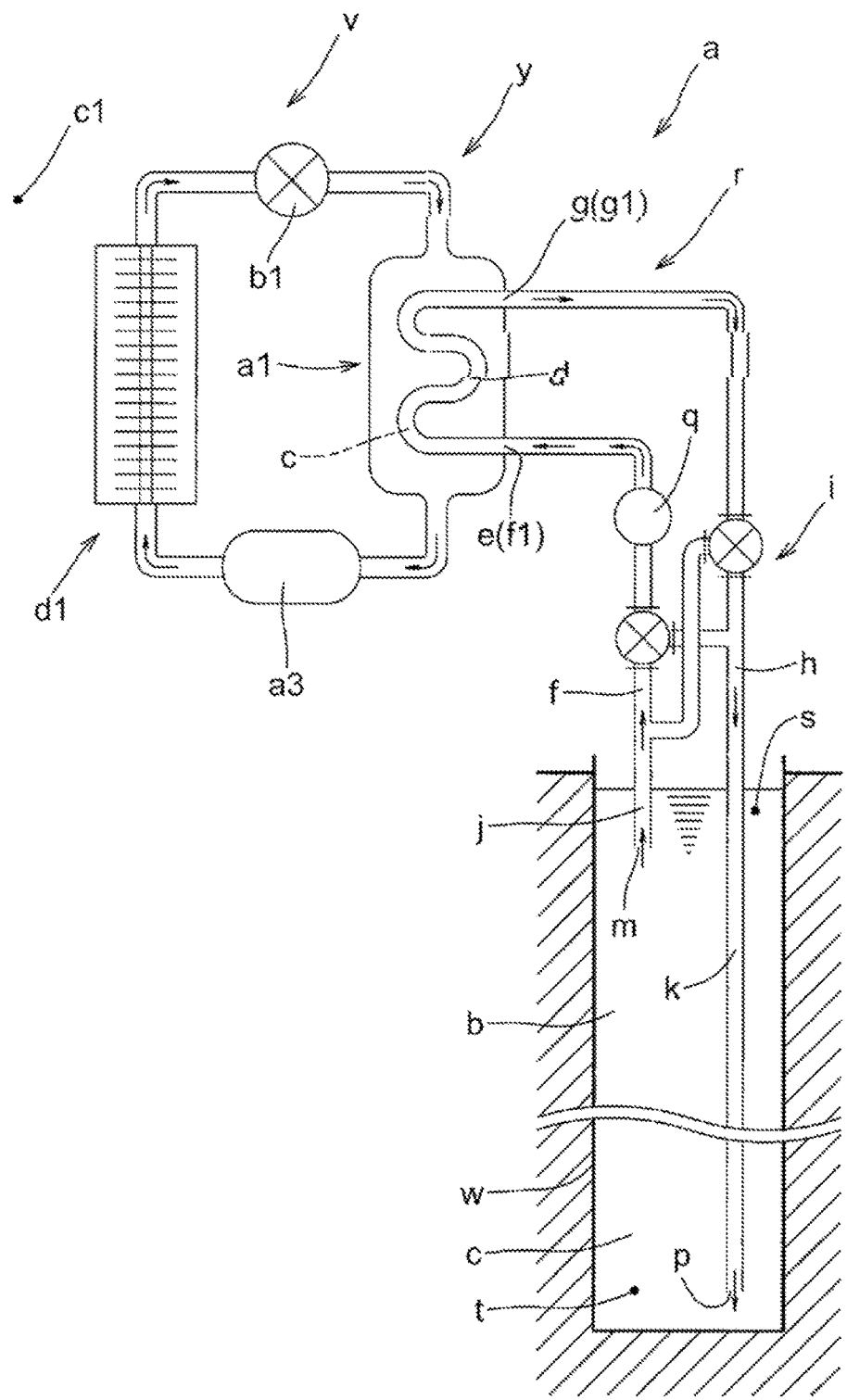
FIG. 18 is an explanatory view describing a problem of a conventional heat exchange device.
Figure 19:
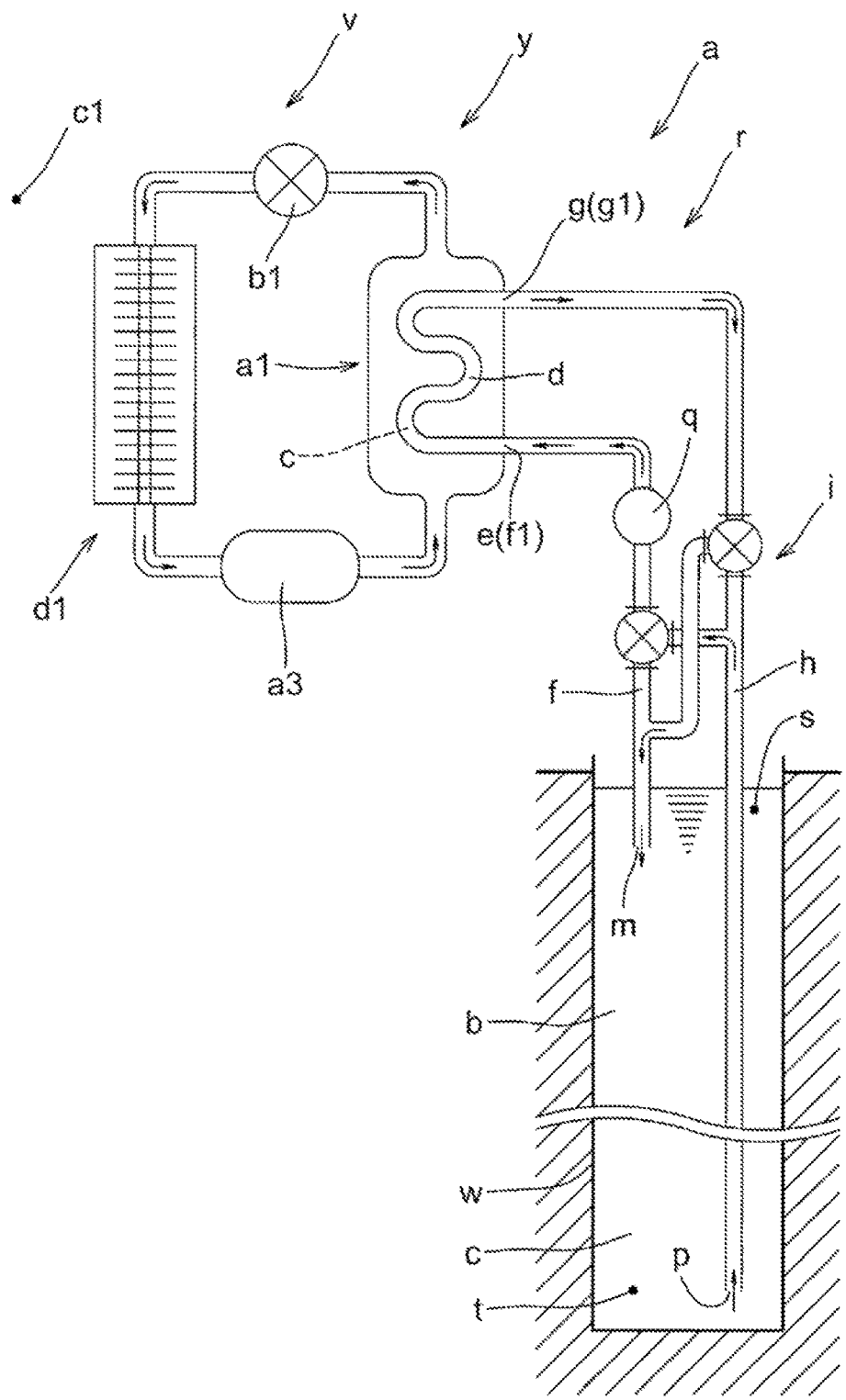
FIG. 19 is an explanatory view describing a problem of a conventional heat exchange device.
Figure 20:
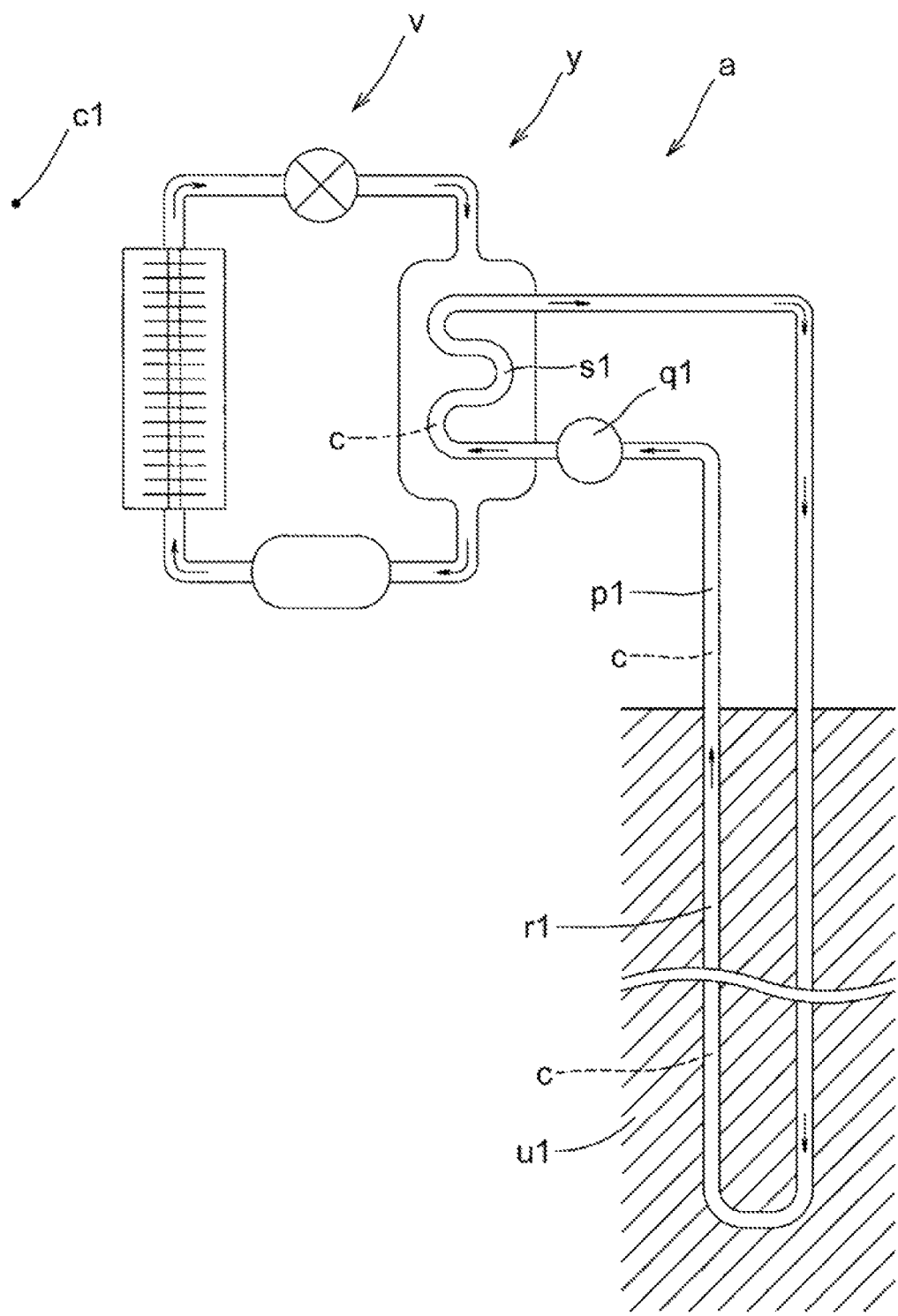
FIG. 20 is an explanatory view describing a problem of a conventional heat exchange device.

As one of the means, it is possible to provide a means for covering an inner surface 97 of the flow channel 3 of the first heat exchange unit 6 with a water-repellent coating film 99, for example, as shown in FIG. 17. The water-repellent coating film 99 can be formed, for example, by applying a water-repellent resin coating such as a fluorine coating or a hydrophobic silica coating, or can be formed by a super water-repellent coating obtained by applying a nano meter size plating.

In a case where the inner surface 97 of the flow channel 3 of the first heat exchange unit 6 is covered with the water-repellent coating film 99 as mentioned above, even if a core for freezing is generated on a surface 100 of the water-repellent coating film 99, the core can be easily peeled from the surface 100 on the basis of the flow speed of the water and the water repellency of the water-repellent coating film 99 by setting the temperature of the water (the heat transfer medium liquid 2) flowing in the flow channel 3 to a temperature (for example, 2° C.) which is higher than 0° C. Further, the peeled core can be flowed out by the water stream and be melted.

Accordingly, even when the heat exchange device 1 using the water as the heat transfer medium liquid 2 carries out the heating operation, it is possible to prevent the water (the heat transfer medium liquid 2) from being frozen while flowing in the flow channel 3 of the first heat exchange unit 6.

(7) The heat exchange device 1 structured such that the amount of heat exchange in the first heat exchange unit fluctuates by the passage of time can be used for constructing the water-cooled type heat pump device 29. The water-cooled type heat pump device 29 can be used for the structure of the cooling and heating device mentioned above, and can be also used for constructing the hot water machine and the refrigerating machine.

The invention claimed is:

1. A method of controlling a heat exchange device structured such that:
a flow channel in which a heat transfer medium liquid flows is provided,
the flow channel is provided with a heat transfer medium liquid circulation flow channel having a first heat exchange unit which exchanges heat in relation to a second heat exchange unit coming to a load side,
a fixed amount of the heat transfer medium liquid circulates in the heat transfer medium liquid circulation flow channel, and an amount of heat exchange in the first heat exchange unit fluctuates due to passage of time on the basis of fluctuation of an amount of heat required by the load side, wherein the method comprises:

detecting a temperature of the heat transfer medium liquid at an outlet end of said first heat exchange unit, supplying a necessary amount of the heat transfer medium liquid capable of applying the amount of heat required by the first heat exchange unit to the heat transfer medium liquid circulation flow channel by a heat source which holds a second heat transfer medium liquid having a temperature difference from the heat transfer medium liquid, in such a manner that the detected temperature of the heat transfer medium liquid at the outlet end of the first heat exchange unit maintains a required set temperature in a side where an inlet end of the first heat exchange unit exists, and discharging the same amount of the heat transfer medium liquid as that of the supplied heat transfer medium liquid in a side where the outlet end of the first heat exchange unit exists, wherein the supplying of the necessary amount of the heat transfer medium liquid includes operating a valve, in response to the detected temperature of said heat transfer medium liquid at said outlet end of said first heat exchange unit, to adjust the supplying of the necessary amount of the heat transfer medium liquid.

2. A heat exchange device comprising:

a flow channel in which a first heat transfer medium liquid is constrained to flow, the flow channel including a heat transfer medium liquid circulation flow channel having a first heat exchange unit configured to exchange heat in relation to a second heat exchange unit on a load side;

a pump disposed in operative engagement with said flow channel for circulating a fixed amount of the first heat transfer medium liquid in the heat transfer medium liquid circulation flow channel, wherein an amount of heat exchange in the first heat exchange unit fluctuates in accordance with an amount of heat required by the load side;

a feed pipe containing the first heat transfer medium liquid coupled to said first heat exchange unit by a valve on a side proximate an inlet end of the first heat exchange unit; and a discharge pipe coupled to a side where an outlet end of the first heat exchange unit, a temperature detector disposed at the outlet end of the first heat exchange unit to sense temperature of the heat transfer medium exiting the first heat exchange unit, wherein the heat exchange device is configured to control the valve, in response to the temperature sensed by the temperature detector, to supply an amount of the first heat transfer medium liquid so that the temperature of the first heat transfer medium liquid at the outlet end maintains a required set temperature, and wherein the same amount of the first heat transfer medium liquid is discharged from the discharge pipe.

3. The heat exchange device according to claim 2, wherein the heat source is a groundwater collecting storage tank which holds the second heat transfer medium liquid as a groundwater having a temperature difference from the first heat transfer medium liquid, is buried in the ground and always moves the groundwater in and out.

4. The heat exchange device according to claim 2, wherein the heat source holding the second heat transfer medium liquid having the temperature difference from the first heat transfer medium liquid is a heat exchange storage tank which is buried in the ground.

5. The heat exchange device according to claim 2, wherein the heat supply source constructing the heat source is selected from a group of groundwater, hot spring discharged water, industrial liquid waste, sewage water waste liquid, river water, lake water, marine water, snow, ice and gas.

6. The heat exchange device according to claim 2, wherein the second heat transfer medium liquid is a heat transfer medium liquid which is cooled by a cooling tower.

7. The heat exchange device according to claim 2, wherein an inner surface of the flow channel of the first heat exchange unit is covered with a water-repellent coating film.

8. A water-cooled type heat pump device, wherein the heat exchange device according to claim 2 is employed.

9. A heat exchange device structured such that a flow channel in which a heat transfer medium liquid flows is provided, the flow channel is provided with a heat transfer medium liquid circulation flow channel having a first heat exchange unit which exchanges heat in relation to a second heat exchange unit coming to a load side, a first heat transfer medium liquid circulates in the heat transfer medium liquid circulation flow channel by driving a first pump attached thereto, and an amount of heat exchange in the first heat exchange unit fluctuates due to passage of time on the basis of fluctuation of an amount of heat required by the load side, wherein the heat exchange device comprises:

a feed pipe for setting a heat source which holds the first heat transfer medium liquid having a temperature difference from the first heat transfer medium liquid and the heat transfer medium liquid circulation flow channel in a communication state, the feed pipe being coupled by a valve to a side where an inlet end of the first heat exchange unit exists;

a temperature detector disposed at an outlet end of the first heat exchange unit to sense temperature of the heat transfer medium liquid exiting the first heat exchange unit;

a discharge pipe coupled to the outlet end of the first heat exchange unit; and a second pump attached to and communicating with said feed pipe, wherein the heat exchange device is controlled the valve to supply an amount of the first heat transfer medium liquid, responsive to heat required by the first heat exchange unit, to an inlet end of the first heat exchange unit via the feed pipe, so that a temperature of the first heat transfer medium liquid sensed by the temperature detector at the outlet end of the first heat exchange unit maintains a required set temperature, on the basis of the driving of the second pump, wherein the same amount of the first heat transfer medium liquid is discharged from the discharge pipe.

10. The heat exchange device according to claim 9, wherein the heat source is a groundwater collecting storage tank which holds the second heat transfer medium liquid as a groundwater having a temperature difference from the first heat transfer medium liquid, is buried in the ground and always moves the groundwater in and out.

11. The heat exchange device according to claim 9, wherein the heat source holding the second heat transfer medium liquid having the temperature difference from the first heat transfer medium liquid is a heat exchange storage tank which is buried in the ground.

12. The heat exchange device according to claim 9, wherein the heat supply source constructing the heat source is selected from a group of groundwater, hot spring discharged water, industrial liquid waste, sewage water waste liquid, river water, lake water, marine water, snow, ice and gas.

13. The heat exchange device according to claim 9, wherein the second heat transfer medium liquid is a heat transfer medium liquid which is cooled by a cooling tower.

14. The heat exchange device according to claim 9, wherein an inner surface of the flow channel of the first heat exchange unit is covered with a water-repellent coating film.

15. A water-cooled type heat pump device, wherein the heat exchange device according to claim 9 is employed.

* * * * *